(12) United States Patent
Nishida et al.

(10) Patent No.: US 7,689,252 B2
(45) Date of Patent: Mar. 30, 2010

(54) METHOD AND SYSTEM FOR PROCESSING INFORMATION

(75) Inventors: Yoshifumi Nishida, Kanagawa (JP); Atsushi Shionozaki, Tokyo (JP)

(73) Assignee: Sony Corporation, Tokyo (JP)

( * ) Notice: Subject to any disclaimer, the term of this patent is extended or adjusted under 35 U.S.C. 154(b) by 408 days.

(21) Appl. No.: 11/447,155

(22) Filed: Jun. 6, 2006

(65) Prior Publication Data

US 2007/0113092 A1    May 17, 2007

(30) Foreign Application Priority Data

Jun. 7, 2005   (JP)   ............................ P2005-167234

(51) Int. Cl.
*H04M 1/00* (2006.01)
(52) U.S. Cl. .................. 455/562.1; 455/411; 370/339; 375/262; 375/267
(58) Field of Classification Search .............. 455/435.1, 455/411, 562.1; 370/339; 375/262, 267
See application file for complete search history.

(56) References Cited

U.S. PATENT DOCUMENTS 6,141,558 A * 10/2000 Chen ...................... 455/456.1

| | | | |
|---|---|---|---|
| 2004/0038713 A1 * | 2/2004 | Okawa et al. | 455/561 |
| 2004/0257274 A1 * | 12/2004 | Benco et al. | 342/357.1 |
| 2005/0014503 A1 * | 1/2005 | Nakakita et al. | 455/435.1 |
| 2005/0280574 A1 * | 12/2005 | Tafas et al. | 342/126 |
| 2007/0066234 A1 * | 3/2007 | Lastinger et al. | 455/67.11 |
| 2007/0183358 A1 * | 8/2007 | Cai | 370/328 |

FOREIGN PATENT DOCUMENTS

JP      2002-16968      1/2002

* cited by examiner

*Primary Examiner*—Vincent P Harper
*Assistant Examiner*—Fred A Casca
(74) *Attorney, Agent, or Firm*—Finnegan, Henderson, Farabow, Garrett & Dunner, L.L.P.

(57) ABSTRACT

An information processing system includes an information providing apparatus for providing a service, and a mobile terminal for receiving the service from the information providing apparatus. The information providing apparatus includes a plurality of directional antennas arranged in a predetermined space and forming at least one particular area in which communication coverage areas of the directional antennas overlap each other, and a plurality of data transmitting units for transmitting predetermined data to the mobile terminal in the particular area using the directional antennas thereof. The mobile terminal includes a data receiving unit for receiving in the particular area the predetermined data that the data transmitting unit has transmitted via the directional antenna having the particular area as the communication coverage area, and a data processing unit for processing the predetermined data received by the data receiving unit.

7 Claims, 24 Drawing Sheets

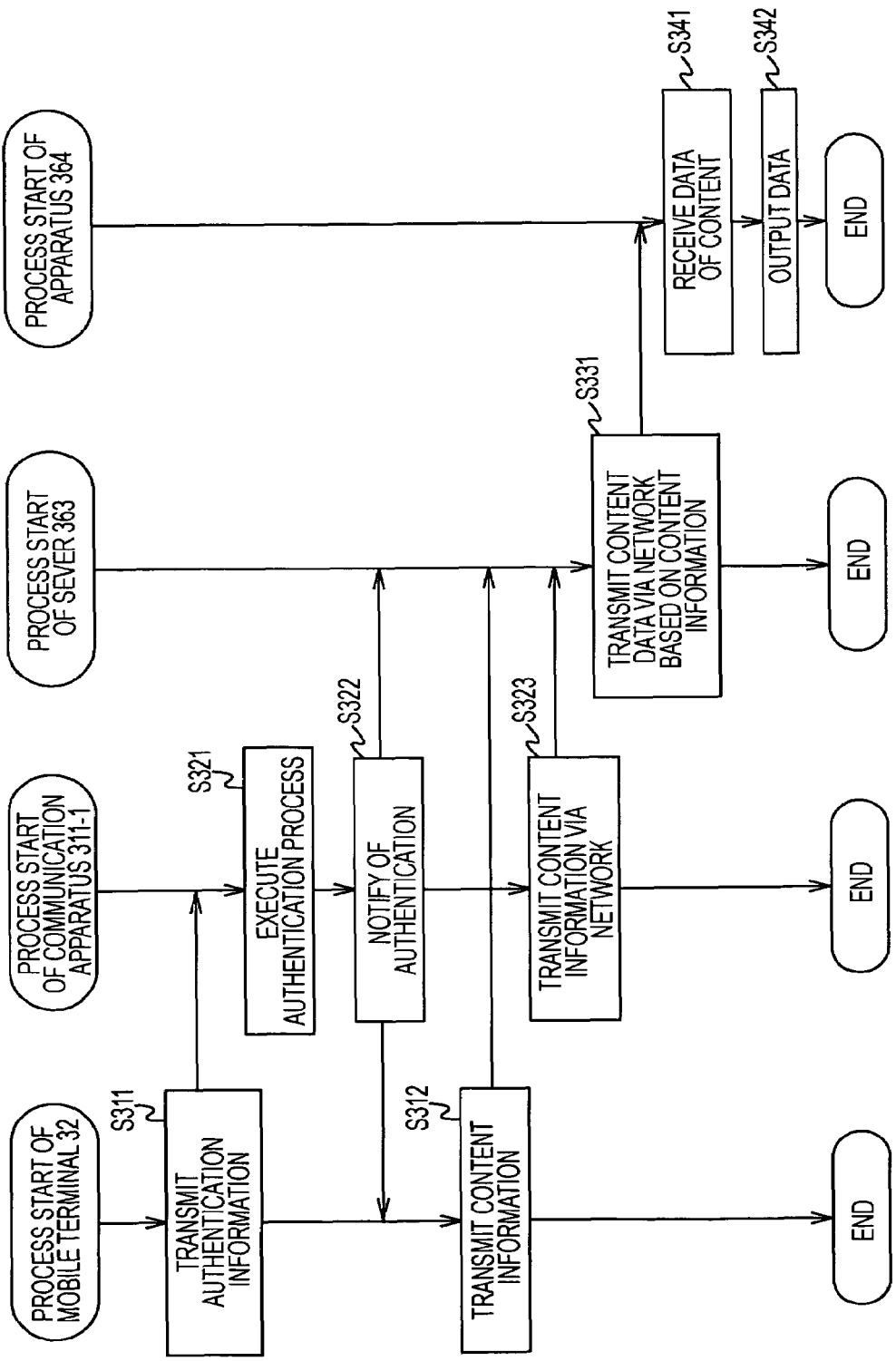

METHOD AND SYSTEM FOR PROCESSING INFORMATION

CROSS REFERENCES TO RELATED APPLICATIONS

The present invention contains subject matter related to Japanese Patent Application JP 2005-167234 filed in the Japanese Patent Office on Jun. 7, 2005, the entire contents of which are incorporated herein by reference.

BACKGROUND OF THE INVENTION

1. Field of the Invention

The present invention relates to an information processing system and an information processing method. More specifically, the present invention relates to an information processing method and an information processing system, which uses a plurality of directional antennas arranged in a space to form a communication coverage area, and provides services of different levels depending on the locations of users within the space.

2. Description of the Related Art

Radio communications not using cables are substantially different in directivity depending on characteristics of radio communications techniques, and setting and configuration of communication apparatuses. Some radio communications provide sharp directivity, some provide modest directivity, and the other provide no directivity at all.

Available as sharp directivity communication techniques are optical communication techniques such as infrared communications, and radio communications based on directional antennas and millimeter wave, each offering sharp directivity.

When communication techniques providing sharp directivity are used, a communication coverage area extends in one direction as shown in FIG. 1.

As shown in FIG. 1, a communication apparatus 1 works based on communication techniques providing sharp directivity. With its sharp directivity, the communication apparatus 1 provides a communication coverage area 1A extending in one direction only. A mobile terminal 2-1 present within the communication coverage area 1A of the communication apparatus 1 can communicate with the communication apparatus 1. A mobile terminal 2-2 outside the communication coverage area 1A of the communication apparatus 1 is unable to communicate with the communication apparatus 1.

Most of directivity communication techniques are strongly dependent on distance. The farther the radio apparatuses are spaced apart, the worse the quality of communications becomes.

If a plurality of apparatuses performing directivity communications are present within a single space, several apparatuses can communicate with each other in one area while none of the apparatuses can communicate with each other in the other area. Depending on the location within the space, the number of apparatuses communicable with each other and communication quality becomes different.

Japanese Unexamined Patent Application Publication No. 2002-16968 discloses one technique in which an apparatus having two directional antennas is arranged within a single space, and a mobile terminal present within a communication coverage area of the two directional antennas is identified so that a service is provided to the identified mobile terminal only.

SUMMARY OF THE INVENTION

With an apparatus permitting a plurality of directivity communications being arranged within a single space, particular areas different in the number of terminals communicable within the space and in communication quality are formed. Known systems providing service taking advantage of such a particular area are not many. One system disclosed in Japanese Unexamined Patent Application Publication No. 2002-16968 uses a particular radio communication technique.

A number of radio communication techniques are available. There is a need for providing a variety of services using a particular area formed with an apparatus permitting a plurality of directivity communications arranged in a single space without being limited to any radio communication techniques.

It is desirable to provide easily services of different levels depending on the location within the space with no limitation to any particular technique.

In an information processing system of one embodiment of the present invention, an information providing apparatus includes a plurality of directional antennas arranged in a predetermined space and forming at least one particular area in which communication coverage areas of the directional antennas overlap each other, and a plurality of data transmitting units for transmitting predetermined data to the mobile terminal in the particular area using the directional antennas thereof. A mobile terminal includes a data receiving unit for receiving in the particular area the predetermined data that the data transmitting unit has transmitted via the directional antenna having the particular area as the communication coverage area, and a data processing unit for processing the predetermined data received by the data receiving unit.

The predetermined data contains authentication information required when the information providing apparatus performs authentication. The data processing unit obtains the authentication information using a plurality of units of predetermined data received by the data receiving unit. The mobile terminal further includes an authentication information transmitting unit for transmitting to the information providing apparatus the authentication information obtained by the data processing unit.

The information providing apparatus may further includes an authentication information receiving unit for receiving via the directional antenna the authentication information transmitted by the authentication information transmitting unit, and an authentication unit for authenticating the mobile terminal based on the authentication information received by the authentication information receiving unit.

The predetermined data forms a content. The data processing unit generates an output signal formed of the data of the content in response to the content received by the data receiving unit, and the mobile terminal may further include an output control unit for outputting to a user the output signal generated by the data processing unit.

An information processing method of one embodiment of the present invention includes a data transmitting step of transmitting predetermined data to the mobile terminal present in a particular area using a plurality of directional antennas arranged in a predetermined space and forming the particular area in which communication coverage areas of the directional antennas overlap each other, a data receiving step of receiving in the particular area the predetermined data transmitted in the data transmitting step via the directional antenna having the particular area as the communication coverage area, and a processing step of processing the predetermined data received in the data receiving step.

The information providing apparatus transmits the predetermined data to the mobile terminal in the particular area using the plurality of directional antennas arranged in the predetermined space and forming the particular area in which communication coverage areas of the directional antennas overlap each other. The mobile terminal receives in the particular area the predetermined data transmitted via the directional antenna having the particular area as the communication coverage area, and processes the received predetermined data.

In accordance with embodiments of the present invention, a variety of services are provided depending on the location within the space.

BRIEF DESCRIPTION OF THE DRAWINGS

FIG. 24 is a flowchart illustrating the process of the service providing system of FIG. 20.

DESCRIPTION OF THE PREFERRED EMBODIMENTS

Before describing an embodiment of the present invention, the correspondence between the features of the claims and the specific elements disclosed in an embodiment of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiments are described in the claims. That is, the description does not deny the existence of aspects of the present invention that are described in the embodiments but not claimed in the invention of this application, i.e., the existence of aspects of the present invention that in future may be claimed by a divisional application, or that may be additionally claimed through amendments.

Figure 4:
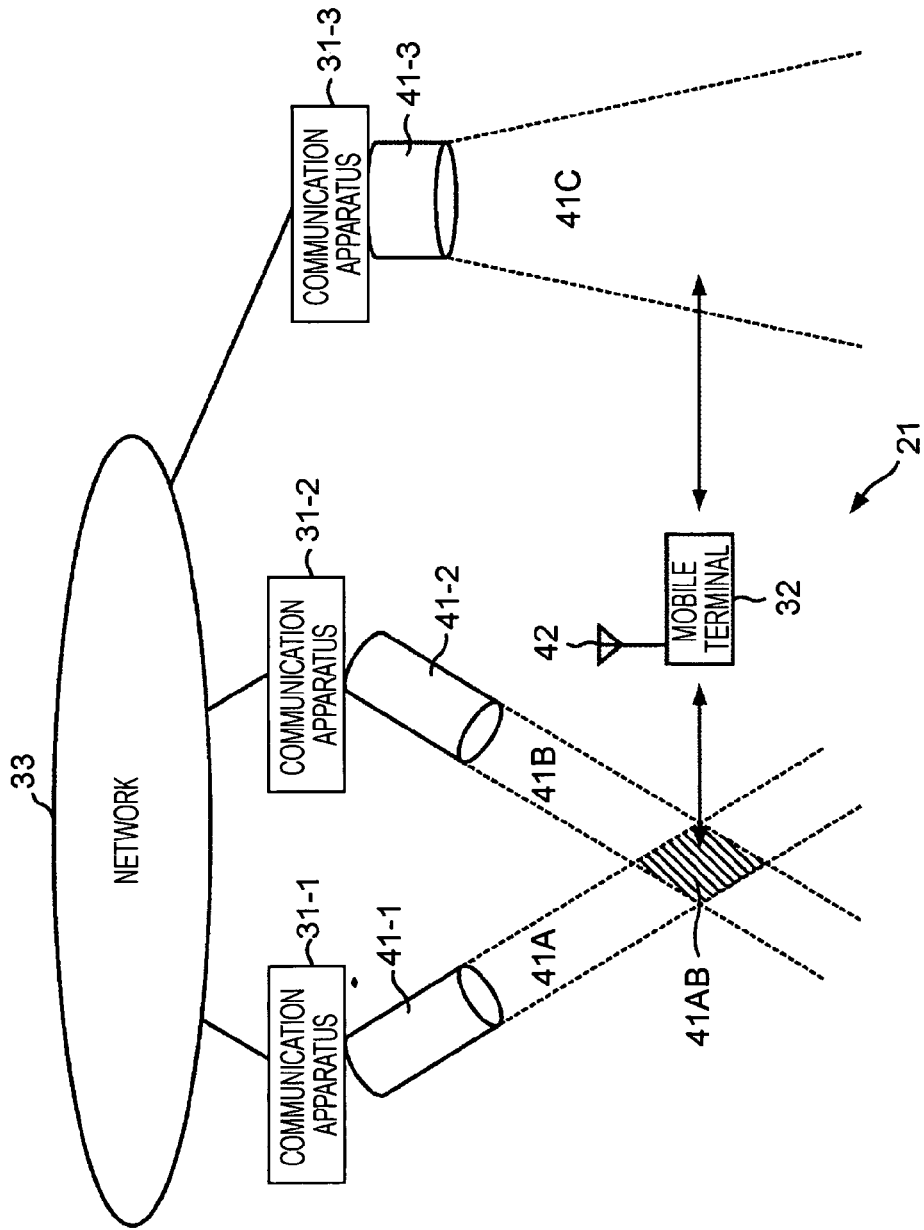
FIG. 4 illustrates one configuration of a service providing system of one embodiment of the present invention.

In an information processing system (for example, a service providing system 21 of FIG. 4) of one embodiment of the present invention, an information providing apparatus (for example, a service providing apparatus composed of a communication apparatus 31-1 through a communication apparatus 31-3 connected to a network 33 of FIG. 4) includes a plurality of directional antennas (for example, antennas 41-1 through 42-2 of FIG. 4) arranged in predetermined space and forming at least one particular area in which communication coverage areas of the directional antennas overlap each other, and a plurality of data transmitting units (for example, a radio communication unit 58 of each of communication apparatuses 31-1 and 31-2 of FIG. 4) for transmitting predetermined data to the mobile terminal in the particular area using the directional antennas thereof. A mobile terminal (for example, a mobile terminal 32 of FIG. 4) includes a data receiving unit (for example, a radio communication unit 108 of FIG. 6) for receiving in the particular area the predetermined data that the data transmitting unit has transmitted via the directional antenna having the particular area as the communication coverage area, and a data processing unit (for example, a data processor 132 of FIG. 7) for processing the predetermined data received by the data receiving unit.

The predetermined data contains authentication information required when the information providing apparatus performs authentication. The data processing unit obtains the authentication information using a plurality of units of predetermined data received by the data receiving unit. The mobile terminal further includes an authentication information transmitting unit (for example, an authentication data transmitter 133 of FIG. 7) for transmitting to the information providing apparatus the authentication information obtained by the data processing unit.

The information providing apparatus further includes an authentication information receiving unit (for example, a radio communication unit 58 of FIG. 5 in the communication apparatus 31-3 of FIG. 4) for receiving via the directional antenna the authentication information transmitted by the authentication information transmitting unit, and an authentication unit (for example, a CPU 51 of FIG. 5 in the communication apparatus 31-3 of FIG. 4) for authenticating the mobile terminal based on the authentication information received by the authentication information receiving unit.

In the information processing system (for example, a service providing system 201 of FIG. 11), the predetermined data forms a content. The data processing unit (for example, a data generator 232 of FIG. 12) generates an output signal formed of the data of the content in response to the content received by the data receiving unit, and the mobile terminal further include an output control unit (for example, a data output controller 233 of FIG. 12) for outputting to a user the output signal generated by the data processing unit.

An information processing method of one embodiment of the present invention includes a data transmitting step (for example, step S22 of FIG. 9) of transmitting predetermined data to the mobile terminal present in a particular area using a plurality of directional antennas arranged in a predetermined space and forming the particular area in which communication coverage areas of the directional antennas overlap each other, a data receiving step (for example, step S12 of FIG. 9) of receiving in the particular area the predetermined data-transmitted in the data transmitting step via the directional antenna having the particular area as the communication coverage area, and a processing step (for example, step S13 of FIG. 9) of processing the predetermined data received in the data receiving step.

The embodiments of the present invention are described below with reference to the drawings.

The concept of a communication area used in a service providing system related to one embodiment of the present invention is described below with reference to FIGS. 2 and 3.

Figure 1:
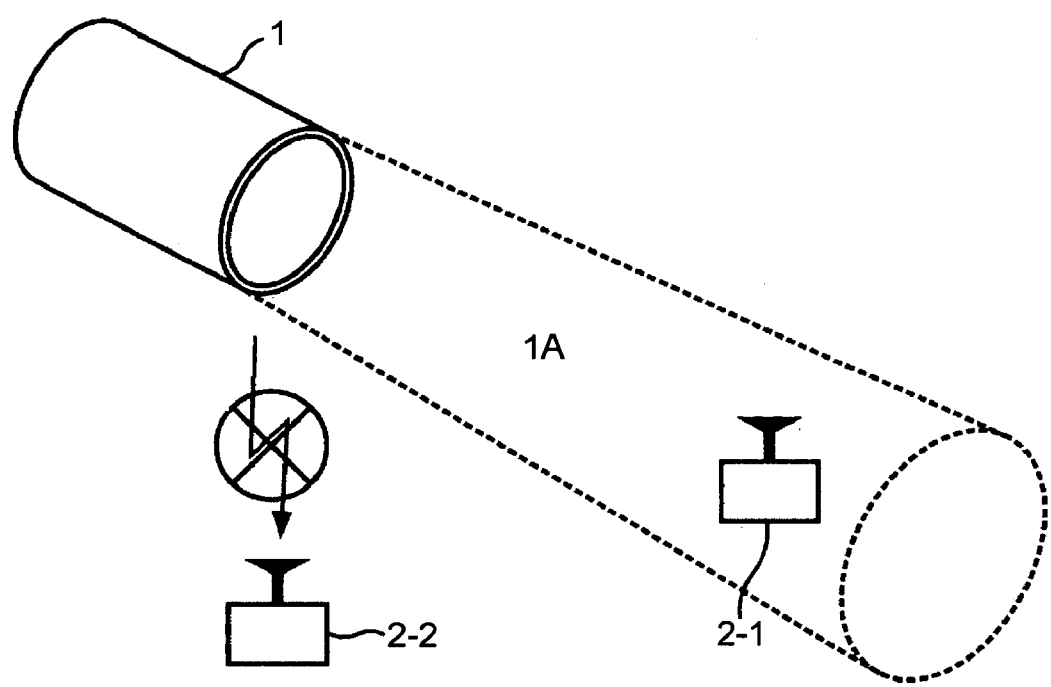
FIG. 1 illustrates radio communication using a sharp directivity pattern.
Figure 2:
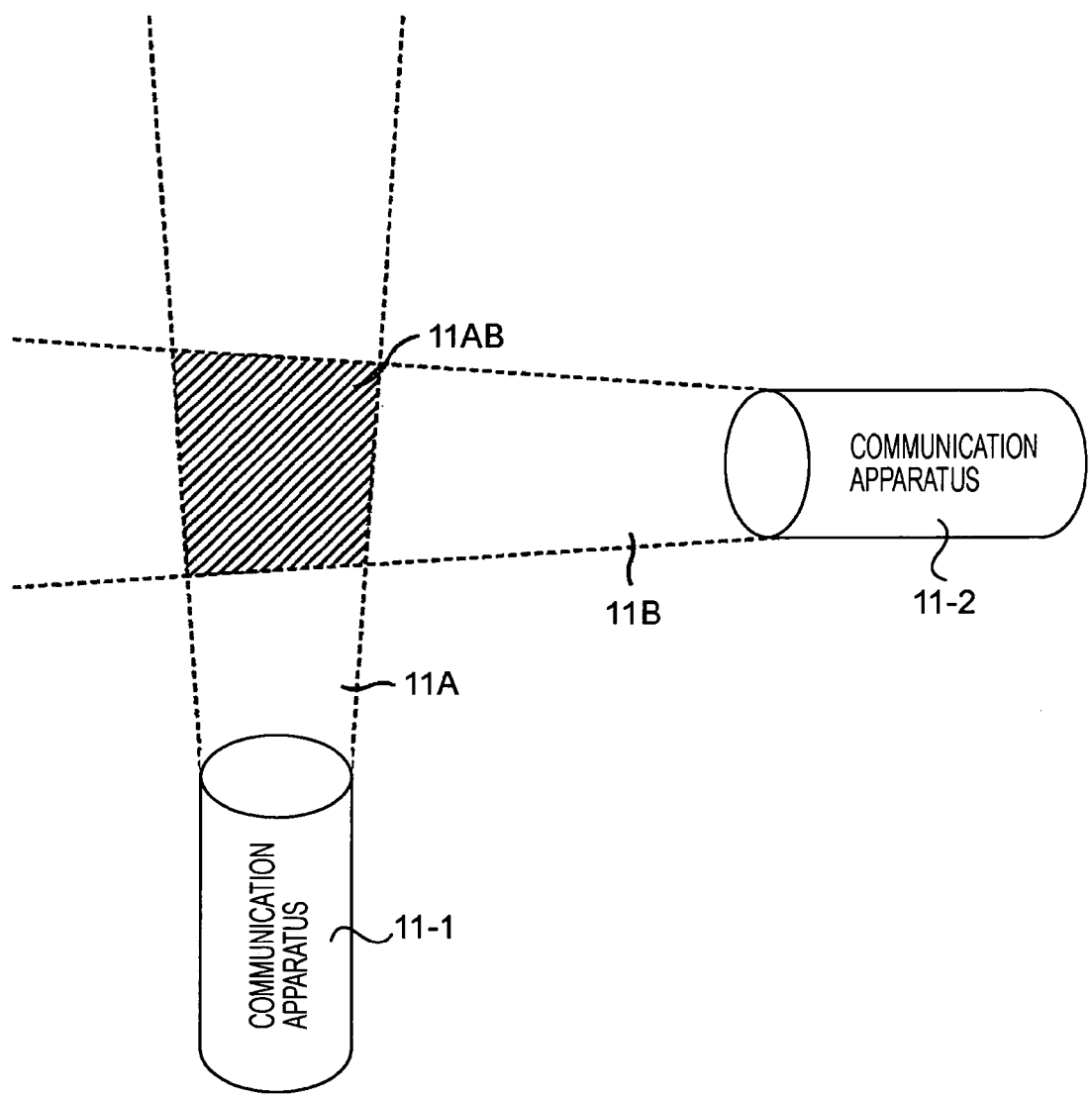
FIG. 2 illustrates the concept of a communication coverage area used in one embodiment of the present invention.

Referring to FIG. 2, each of communication apparatuses 11-1 and 11-2 is designed using radio communication techniques based on a relatively sharp directivity pattern (having half-power angle of 30 degrees), and arranged in predetermined space.

Available as sharp directivity communication techniques are optical communication techniques such as infrared communications, and radio communications based on directional antennas and millimeter wave, each offering sharp directivity.

The communication apparatus 11-1 with the directivity thereof has a communication coverage area 11A looking upward and transmits data to and receive data from a device present within the communication coverage area 11A. The communication apparatus 11-2 with the directivity thereof has a communication coverage area 11B looking leftward and transmits data to and receive data from a device present within the communication coverage area 11B.

Since the communication apparatus 11-1 and the communication apparatus 11-2 are arranged within the predetermined space in a positional relationship of FIG. 2, a communication coverage area 11AB where the communication coverage area 11A overlaps the communication coverage area 11B is formed.

More specifically, the space of FIG. 2 contains the communication coverage area 11A where the communication apparatus 11-1 can transmit and receive data, the communication coverage area 11B where the communication apparatus 11-2 can transmit and receive data, the communication coverage area 11AB where both the communication apparatus 11-1 and the communication apparatus 11-2 can transmit and receive data, and an area where neither the communication apparatus 11-1 nor communication apparatus 11-2 can communicate.

Figure 3:
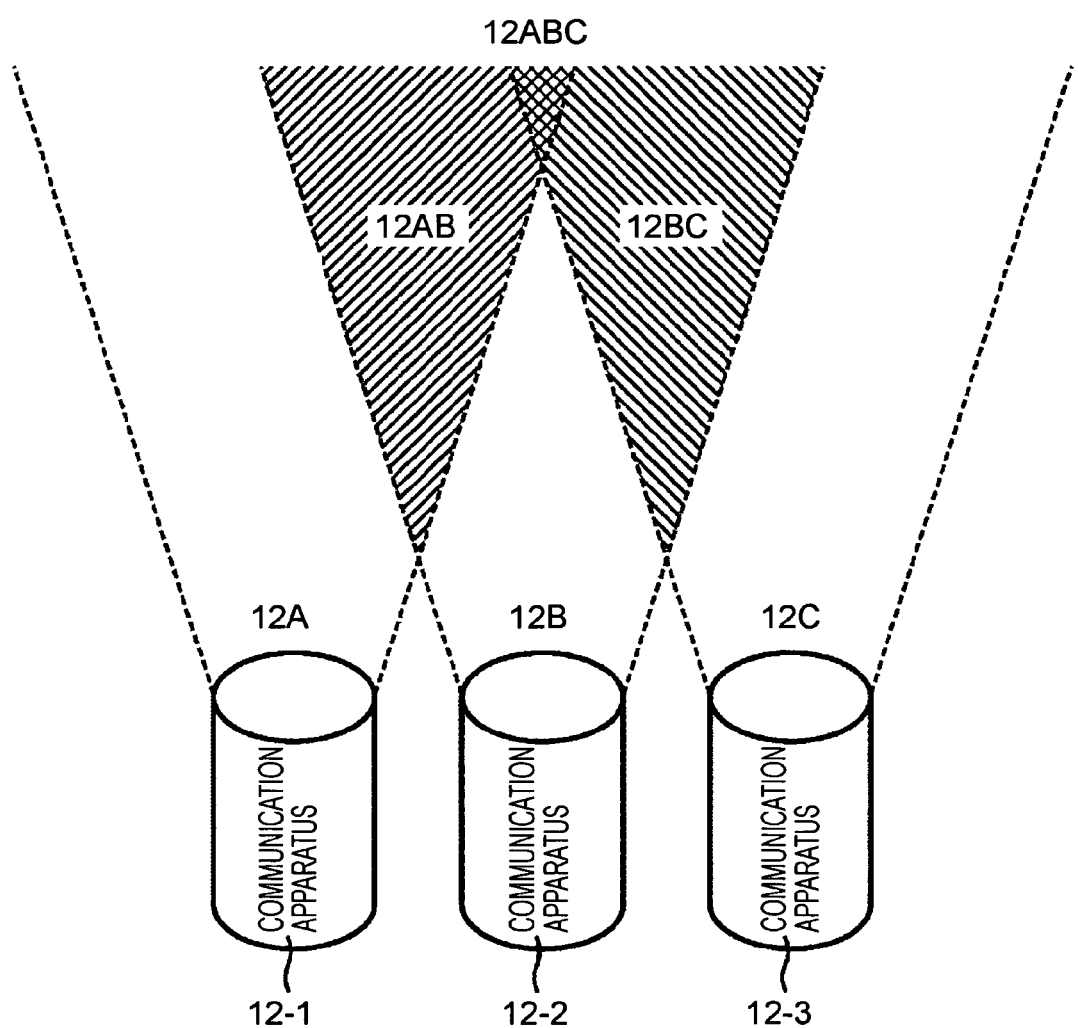
FIG. 3 illustrates the concept of the communication coverage area used in one embodiment of the present invention.

Referring to FIG. 3, communication apparatuses 12-1 through 12-3 are designed based on radio communication techniques providing a relatively sharp directivity, and arranged within a predetermined space as the communication apparatuses 11-1 and 11-2 are designed and arranged.

The communication apparatus 12-2 with the directivity pattern thereof has a communication coverage area 12A looking upward and can transmit data to and receive data from a device present within the communication coverage area 12A. The communication apparatus 12-1 with the directivity pattern thereof has a communication coverage area 12B looking upward, and can transmit data to and receive data from a device present within the communication coverage area 12B. The communication apparatus 12-3 with the directivity pattern thereof has a communication coverage area 12C looking upward, and can transmit data to and receive data from a device present within the communication coverage area 12C.

The communication apparatuses 12-1 through 12-3 are arranged within a predetermined space in a positional relationship of FIG. 3. A communication coverage area 12AB where the communication coverage area 12A and the communication coverage area 12B overlap each other is formed. A communication coverage area 12BC where the communication coverage area 12B and the communication coverage area 12C overlap each other is formed. A communication coverage area 12ABC where the communication coverage area 12A, the communication coverage area 12B, and the communication coverage area 12C overlap each other is formed.

More specifically, the space of FIG. 3 contains the communication coverage area 12A where the communication apparatus 12-1 can transmit and receive data, the communication coverage area 12B where the communication apparatus 12-2 can transmit and receive data, the communication coverage area 12C where the communication apparatus 12-3 can transmit and receive data, the communication coverage area 12AB where both the communication coverage area 12A and the communication coverage area 12B can transmit and receive data, the communication coverage area 12BC where both the communication apparatus 12-2 and the communication apparatus 12-3 can transmit and receive data, the communication coverage area 12ABC where the communication apparatuses 12-1 through 12-3 can transmit and receive data, and an area where none of the communication apparatuses 12-1 through 12-3 can transmit and receive data.

The number of communication apparatuses is two in FIG. 2 and three in FIG. 3. The number of communication apparatuses is not limited to two or three. Four or more communication apparatuses may also be used.

If a plurality of apparatuses using radio communication techniques having directivity are arranged within a single space, an area where apparatuses can communicate with each other and an area where none of the apparatuses can communication with each other depending on the location of each apparatus are formed. The number of apparatuses communicable and communication quality become different depending on the location of each apparatus within the space.

Using the area thus formed, a user (a mobile terminal of the user) present within the space is provided with services of different levels dependent on the location of the user.

More specifically, the service providing system of one embodiment of the present invention uses a plurality of communication techniques providing a relatively sharp directivity, thereby forming a particular area where a directivity spotlight impinges (namely, where the number of communicable apparatuses and communication quality are different). Making use of the formed area, the service providing system provides a user (a mobile terminal of the user) present within the space with services of different levels depending on the property of the area.

The method of providing service in this way is defined as spotlight networking. The service providing system using the spotlight networking is described below in more detail.

A service providing system 21 of one embodiment of the present invention is described below with reference to FIG. 4.

In the service providing system 21, communication apparatuses 31-1 through 31-3 include directional antennas 41-1 through 41-3, respectively. Using the directional antennas 41-1 through 41-3, the communication apparatuses 31-1 through 31-3 radio communicate with a mobile terminal 32 present in communication coverage areas 41A through 41C of the directional antennas 41-1 through 41-3 in accordance with IEEE (the Institute of Electrical and Electronics Engineers) 802.11b standard.

The communication apparatuses 31-1 through 31-3 are connected to a network 33 using communications other than the radio communications based on the directional antennas 41-1 through 41-3, and exchange predetermined data with the network 33.

The network 33 may be a wired network or a wireless network. Communication security of the communication apparatuses 31-1 through 31-3 is assured using encryption technique.

The communication apparatuses 31-1 and 31-2 are arranged within a predetermined space to form a communication coverage area 41AB where the communication coverage area 41A of the directional antenna 41-1 and the communication coverage area 41B of the directional antenna 41-2 overlap each other. Using the directional antennas 41-1 and 41-2, the communication apparatuses 31-1 and 31-2 transmit data serving as authentication information which is required by a mobile terminal 32 of a user who may wish to receive service from the service providing system 21.

The data (including data from the communication apparatus 31-1 and data from the communication apparatus 31-2) is received within a predetermined period of time and serve as the authentication information only when these two units of data are received together.

More specifically, the communication apparatus 31-1 encrypts the authentication information, and transmits the encrypted data. The communication apparatus 31-2 transmits encryption key data required by the communication apparatus 31-1 for decryption. The encryption key data is shared by the communication apparatuses 31-1 and 31-2, and updated every predetermined period of time. The updated encryption key data is transmitted from one to the other via the network 33. Only when the two units of data are received within a predetermined period of time, the encrypted authentication information can be decrypted.

For example, the communication apparatus 31-1 segments the authentication information into a plurality of blocks, and transmits a portion of the blocks, and the communication apparatus 31-2 transmits the rest of the blocks other than the portion transmitted by the communication apparatus 31-1. The segmentation of the authentication information is performed by one of the communication apparatuses 31-1 and 31-2 every predetermined period of time, and the segmented authentication information is transmitted from the one to the other via the network 33. Only when the two units of data are received within a predetermined period of time, all blocks forming the authentication information can be received.

If the mobile terminal 32 fails to receive in the communication coverage area 41AB the two units of data from the communication apparatuses 31-1 and 31-2 within a predetermined period of time, the authentication information cannot be received.

The predetermined period of time may be set to the shortest data reception time of the two units of data in the communication coverage area 41AB or may be set to time longer than the shortest time.

The communication apparatus 31-3 is arranged in a space different from the space where the communication apparatuses 31-1 and 31-2 are arranged. Using the directional antenna 41-3, the communication apparatus 31-3 authenticates the mobile terminal 32 of a user who may wish to receive service of the service providing system 21. The communication apparatus 31-3 starts providing the mobile terminal 32 with the service of the service providing system 21 when the mobile terminal 32 is successfully authenticated. The space of the communication apparatuses 31-1 and 31-2 and the space of the communication apparatus 31-3 may not be separate. The communication apparatuses 31-1 through 31-3 may be arranged within the same space.

The services provided by the service providing system 21 includes transmission of music or video data, or opening of a door.

The authentication information is updated in one of the communication apparatuses 31-1 through 31-3 every expiration time set therewithin, and then transmitted to the other apparatuses via the network 33. If the authentication information is not updated by the communication apparatus 31-3 within the expiration time from the reception of the authentication information (such as 10 to 30 seconds), the authentication information is invalidated.

The mobile terminal 32 may be one of a cellular phone, a portable device (PD), a personal digital assistant (PDA), and a small personal computer.

The mobile terminal 32 having a communication antenna 42 is carried by a user, and enters a predetermined area in a space. The mobile terminal 32 in the predetermined area as a communication coverage area then radio communicates with the communication apparatuses 31-1 through 31-3 in accordance with IEEE 802.11b standard. The directivity of the communication antenna 42 is not limited to any specific range. However, the communication antenna 42 needs to have a communication coverage area that permits the mobile terminal 32 to exchange data with each of the directional antennas 41-1 through 41-3 within the communication coverage areas thereof.

The mobile terminal 32 carried by the user into the communication coverage area 41AB exchanges data with each of the communication apparatuses 31-1 and 31-2 having the communication coverage area 41AB thereof, and processes the data for decryption or synthesis to obtain the authentication information.

The mobile terminal 32 carried by the user into the communication coverage area 41C transmits the authentication information to the communication apparatus 31-3 having the communication coverage area 41C, and is authenticated by the communication apparatus 31-3. The user carrying the mobile terminal 32 thus receives the service provided by the service providing system 21.

To receive the service in the service providing system 21 of FIG. 4, the mobile terminal carried by the user needs to be present for a constant duration of time within a predetermined area (i.e., the communication coverage area 41AB).

The user can thus enjoy the corresponding service by simply placing the mobile terminal 32 within the predetermined area or by simply align the mobile terminal 32. The user can receive ambient service in the service providing system 21.

In the above discussion, the communication apparatuses 31-1 through 31-3 exchange data with each other via the network 33 so that the authentication process is performed in the service providing system 21. The communication apparatuses 31-1 through 31-3 connected to the network 33 are considered as a single service providing apparatus, and a server may be connected to the network 33 so that the server controls the communication apparatuses 31-1 through 31-3 as the service providing apparatus.

If there is no need for distinguishing between the communication apparatuses 31-1 through 31-3 and between the directional antennas 41-1 through 41-3, each of the communication apparatuses 31-1 through 31-3 is simply referred to as a communication apparatus 31 and each of the directional antennas 41-1 through 41-3 is simply referred to as a directional antenna 41.

Figure 5:
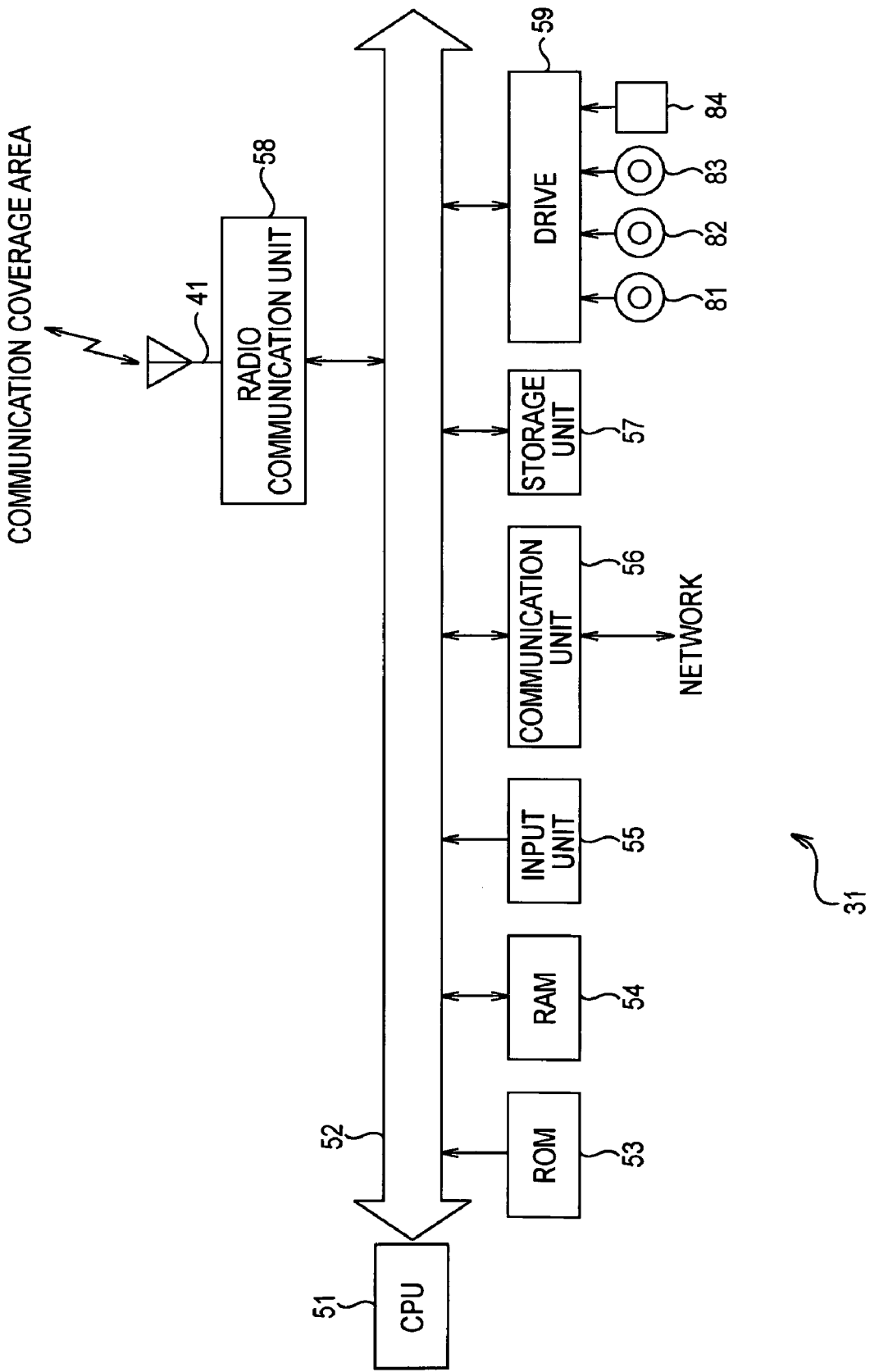
FIG. 5 is a block diagram of a communication apparatus of FIG. 4.

FIG. 5 is a block diagram of the communication apparatus 31.

A central processing unit (CPU) 51 performs a variety of processes under the control of a program stored on a read-only memory (ROM) 53 or a program loaded to a random-access memory (RAM) 54 from a storage unit 57. The RAM 54 also stores data required by the CPU 51 in the execution of the variety of processes.

The CPU 51, the ROM 53, and the RAM 54 are interconnected to each other via a bus 52. Also connected to the bus 52 are an input unit 55 including a keyboard and a mouse, a communication unit 56 including a modem, a terminal adaptor, and a network interface, a storage unit 57 including a hard disk, and a radio communication unit 58 having the directional antenna 41.

The communication unit 56 under the control of the CPU 51 exchanges information with another apparatus connected to the network 33. The radio communication unit 58 under the control of the CPU 51 exchanges information via the directional antenna 41 with another apparatus (such as the mobile terminal 32) present in the communication coverage area of the directional antenna 41.

The bus 52 also connects to a drive 59 as necessary. The drive 59 is loaded with one of a magnetic disk 81, an optical disk 82, a magneto-optical disk 83, and a semiconductor memory 84 as necessary. A computer program read from the storage medium is installed onto the storage unit 57 as necessary.

Figure 6:
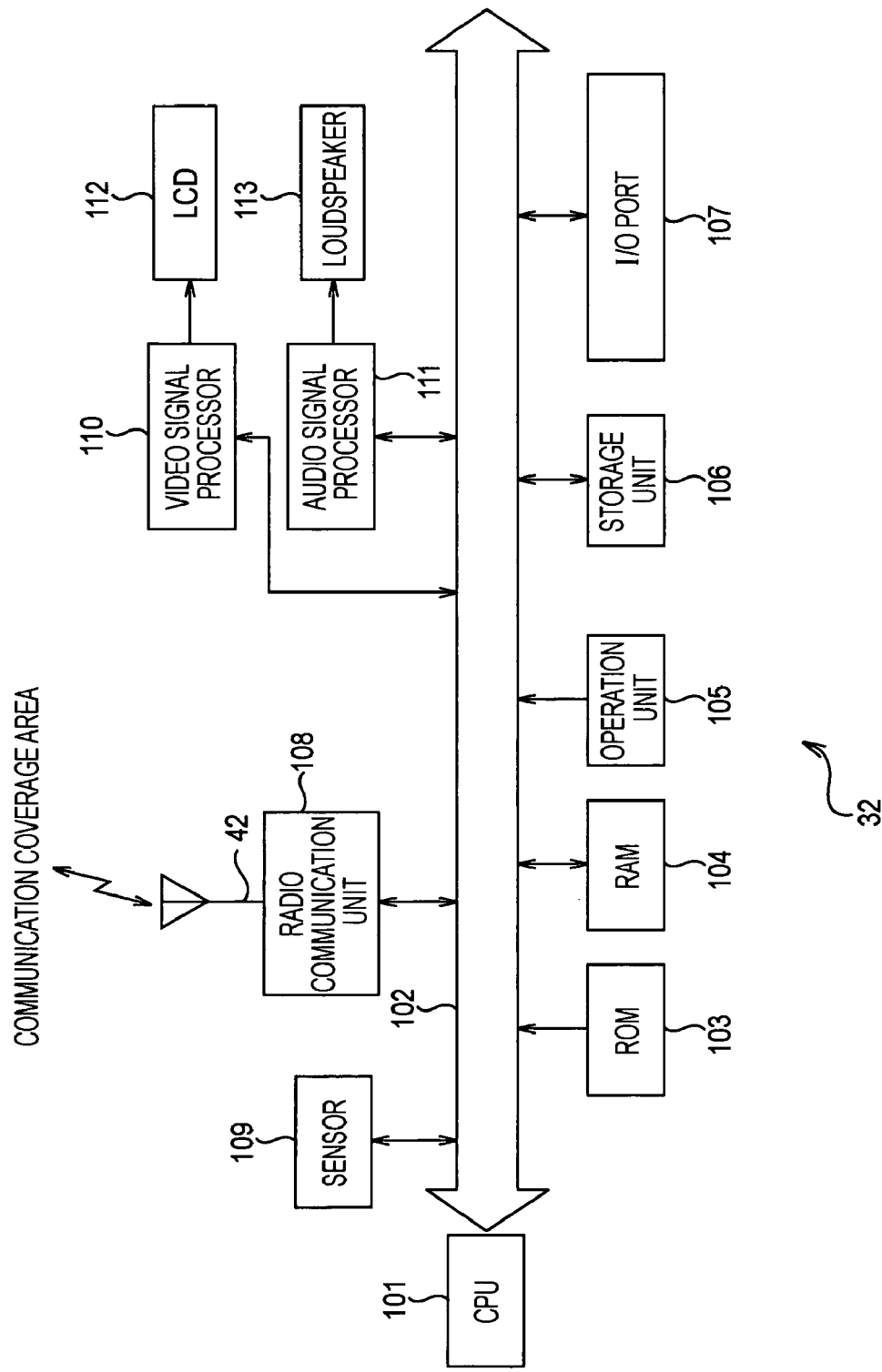
FIG. 6 is a block diagram of a mobile terminal of FIG. 4.

FIG. 6 is a block diagram illustrating the mobile terminal 32.

A CPU 101 performs a variety of processes under the control of a program stored on a ROM 103 or under the control of a program loaded from a storage unit 106 to a RAM 104. The RAM 104 also stores data required by the CPU 101 in the execution of the variety of processes as necessary.

The CPU 101, the ROM 103 and the RAM 104 are interconnected to each other via a bus 102. Also connected to the bus 102 are an operation unit 105, the storage unit 106 including a hard disk, a input/output (I/O) port 107 able to receive a storage medium such as a memory card, a radio communication unit 108, a sensor 109, a video signal processor 110, and an audio signal processor 111.

The operation unit 105 may be composed of a variety of buttons and a touchpanel, and supplies the CPU 101 with a signal responsive to a user operation.

The radio communication unit 108 under the control of the CPU 101 exchanges information via a communication antenna 42 with another apparatus (such as the communication apparatus 31) present in the communication coverage area of the communication antenna 42.

The sensor 109 is composed of one of a gyro sensor and a bearing sensor. When the user performs one action (such as rotation) on the mobile terminal 32, the mobile terminal 32 detects the action, and supplies the detection information to the CPU 101.

The video signal processor 110 under the control of the CPU 101 displays on an LCD 112 an image corresponding to input video data (a still image or a moving image). The audio signal processor 111 under the control of the CPU 101 outputs a sound from a loudspeaker 113 in response to input audio data.

Figure 7:
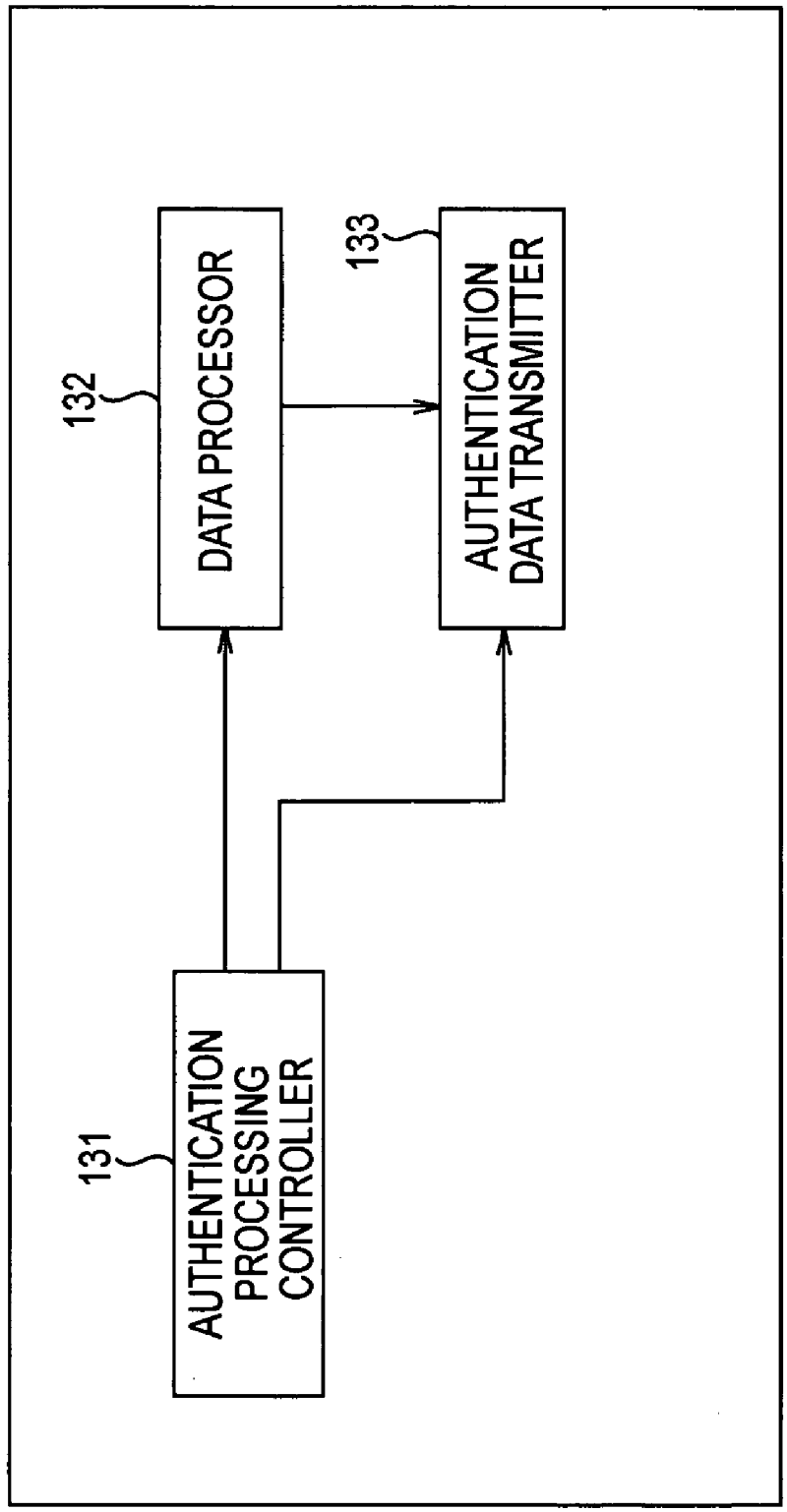
FIG. 7 is a functional block diagram of the mobile terminal of FIG. 6.

FIG. 7 is a functional block diagram illustrating the mobile terminal 32 in the service providing system 21 of FIG. 4. The functional blocks of FIG. 7 are executed when the CPU 101 performs a predetermined program.

Via the radio communication unit 108, an authentication processing controller 131 requests the communication apparatus 31 to transfer the authentication information. The authentication processing controller 131 controls a data processor 132 to process the data received via the radio communication unit 108. The authentication processing controller 131 also controls an authentication data transmitter 133 to transmit via the radio communication unit 108 the authentication information obtained from the data processor 132.

The data processor 132 under the control of the authentication processing controller 131 performs a process to obtain the authentication information using data received from the radio communication unit 108.

More specifically, when encrypted authentication data and encryption key data are input via the radio communication unit 108, the data processor 132 decrypts the encrypted authentication data using the encryption key data, and outputs the resulting authentication information to the authentication data transmitter 133. When the data segmented in a plurality of blocks is input via the radio communication unit 108, the data processor 132 synthesizes the plurality of blocks, and outputs the resulting authentication information to the authentication data transmitter 133.

The authentication data transmitter 133 under the control of the authentication processing controller 131 transmits via the radio communication unit 108 and the communication antenna 42 the authentication information input from the data processor 132.

The process of the service providing system 21 of FIG. 4 is described below with reference FIG. 8 and a flowchart of FIG. 9.

Figure 8:
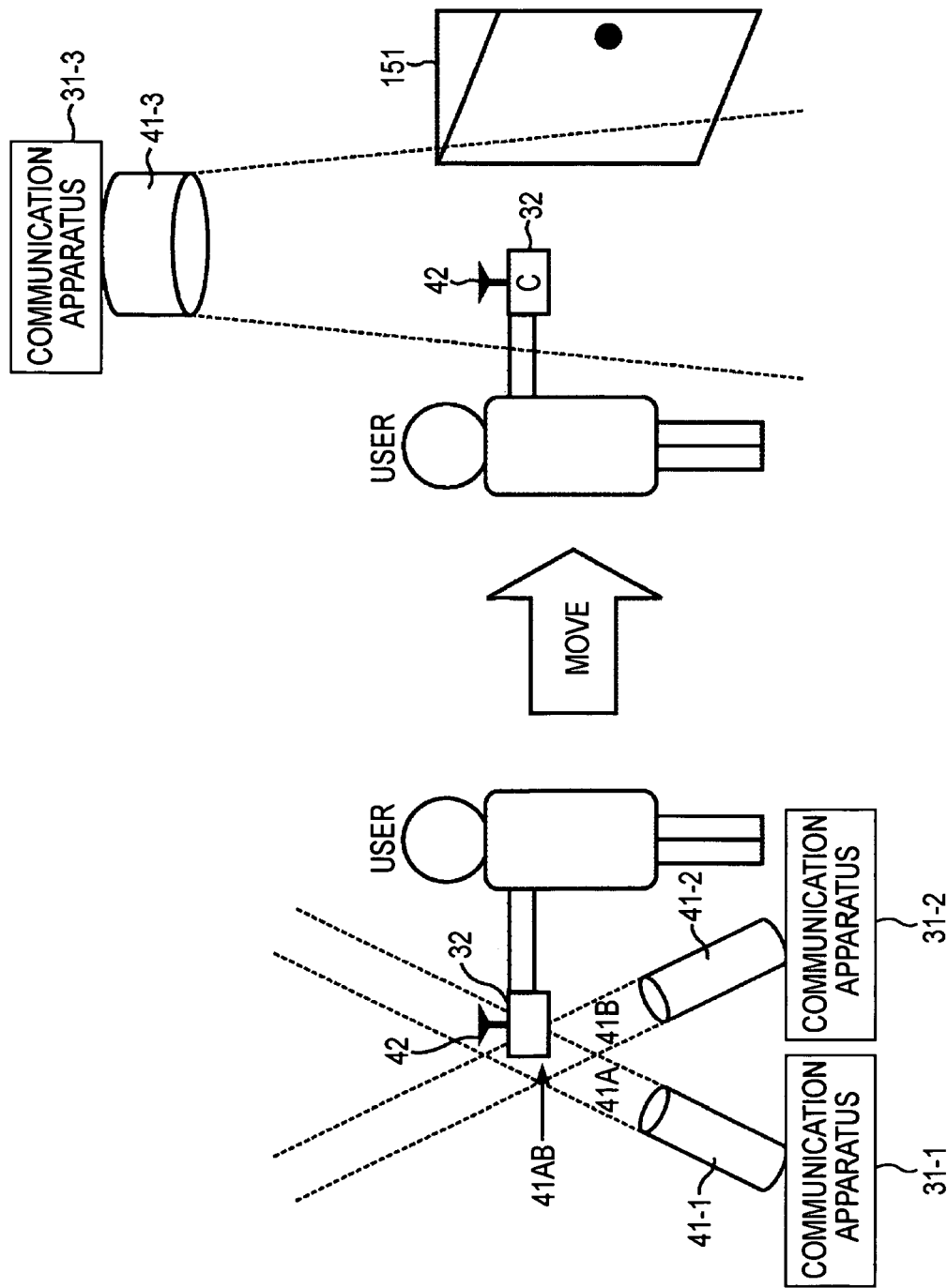
FIG. 8 illustrates services provided by the service providing system of FIG. 4.

FIG. 8 shows a service in which the user carrying the mobile terminal 32 authenticated by the service providing system 21 is permitted to enter a building.

In the space where the communication apparatuses 31-1 and 31-2 are arranged, a communication coverage area 41A of a directional antenna 41-1 of a communication apparatus 31-1 and a communication coverage area 41B of a directional antenna 41-2 of the communication apparatus 31-2 overlaps in an area (namely, a communication coverage area 41AB). To receive the service, the user continuously places the mobile terminal 32 in the communication coverage area 41AB for a predetermined period of time.

The communication coverage area 41AB is invisible to the user except visible light communications. For example, a table may be placed within the communication coverage area 41AB to show the approximate position of the communication coverage area 41AB.

The radio communication units 58 of the communication apparatuses 31-1 and 31-2 transmit calling radio wave to the communication coverage areas 41A and 41B from the directional antennas 41-1 and 41-2, respectively.

The radio communication unit 108 of the mobile terminal 32 present in the communication coverage area 41AB receives the calling radio waves from the communication apparatuses 31-1 and 31-2 via the communication antenna 42, and then notifies the authentication processing controller 131 of the reception of the radio wave. In step S11, the authentication processing controller 131 controls the radio communication unit 108, thereby transmitting a request for the authentication information to the communication apparatuses 31-1 and 31-2 via the communication antenna 42.

In step S21, the radio communication unit 58 of the communication apparatus 31-1 receives the request for the authentication information from the mobile terminal 32, and supplies the CPU 51 with the request. Processing proceeds to step S22.

In response to the request from the mobile terminal 32, the CPU 51 of the communication apparatus 31-1 encrypts the authentication information using the encryption key data shared by the communication apparatus 31-2, and supplies the encrypted authentication data to the radio communication unit 58. In step S22, the radio communication unit 58 transmits the encrypted authentication data to the mobile terminal 32 present within the communication coverage area 41A (containing the communication coverage area 41AB) via the directional antenna 41-1.

In step S31, the radio communication unit 58 in the communication apparatus 31-2 receives the request for the authentication information from the mobile terminal 32 via the directional antenna 41-2, and supplies the request to the CPU 51. Processing proceeds to step S32.

The CPU 51 in the communication apparatus 31-2 supplies the encryption key data shared by the communication apparatus 31-1 in response to the request from the mobile terminal 32. In step S32, the radio communication unit 58 transmits via the directional antenna 41-2 the encryption key data to the mobile terminal 32 present within the communication coverage area 41B (containing the communication coverage area 41AB).

In step S12, the radio communication unit 108 in the mobile terminal 32 receives via the communication antenna 42 the encrypted authentication data from the communication apparatus 31-1 and the encryption key data from the communication apparatus 31-2. The radio communication unit 108 in the mobile terminal 32 then supplies the received data to the authentication processing controller 131 and proceeds to step S13.

In step S13, the authentication processing controller 131 controls the data processor 132, thereby causing the data processor 132 to decrypt the authentication data using the encryption key data and to acquire the authentication information. The data processor 132 supplies the acquired authentication data to the authentication data transmitter 133 and then proceeds to step S14.

The above-mentioned acquisition process of acquiring the authentication information is performed by the mobile terminal 32, and the communication apparatuses 31-1 and 31-2 within a predetermined period of time. When the predetermined period of time has elapsed, the user enters the space where the communication apparatus 31-3 is arranged, and places the mobile terminal 32 in the communication coverage area 41C of the directional antenna 41-3 of the communication apparatus 31-3 for a constant duration of time.

To alert the user to the acquisition of the authentication information, the mobile terminal 32 may cause the LCD 112 or an light-emitting diode (LED) (not shown) to display the elapse of the predetermined period of time or the completion of the acquisition of the authentication information or the loudspeaker 113 to output a sound.

The radio communication unit 58 in the communication apparatus 31-3 transmits a calling radio wave requesting the authentication information to the communication coverage area 41C from the directional antenna 41.

The radio communication unit 108 in the mobile terminal 32 present within the communication coverage area 41C receives the calling radio wave from the communication apparatus 31-3 via the communication antenna 42. The radio communication unit 108 then notifies the authentication processing controller 131 of the reception of the calling radio wave. In step S14, the authentication processing controller 131 controls the authentication data transmitter 133, thereby causing the authentication data transmitter 133 to transmit the authentication information via the radio communication unit 108 and the communication antenna 42.

The radio communication unit 58 in the communication apparatus 31-3 receives the authentication information from the mobile terminal 32 via the directional antenna 41-3, and then supplies the received authentication information to the CPU 51. The authentication information is updated at every expiration time in the service providing system 21 (among the communication apparatuses 31-1 through 31-3). In step S41, the CPU 51 determines whether the authentication information is currently correct authentication information.

If the CPU 51 in the communication apparatus 31-3 determines in step S41 that the authentication information is correct one, processing proceeds to step S42. The use is thus provided with the service of the service providing system 21. More specifically, the communication apparatus 31-3 opens a key of a door 151, and permits the user having the mobile terminal 32 to enter a room with the door 151 opened.

If the expiration time of the authentication information has passed (i.e., if time longer than the expiration time has elapsed since the transmission of the authentication information from the communication apparatuses 31-1 and 31-2), the CPU 51 in the communication apparatus 31-3 determines in step S41 that the authentication information from the mobile terminal 32 is not correct one, and step S42 is skipped. The user is not provided with the service of the service providing system 21.

In the above discussion, the communication apparatuses 31-1 through 31-3 first transmit the calling radio wave. Alternatively, the mobile terminal 32 may transmit first. In other words, a communication start trigger may be transmitted from any side.

The authentication information required to receive the service of the service providing system 21 may be acquired within only the communication coverage area 41AB of the directional antennas 41-1 and 41-2.

By simply placing the mobile terminal 32 within the communication coverage area 41AB of the directional antennas 41-1 and 41-2 (for a predetermined period of time), the user can obtain the authentication information. Thereafter, by simply placing the mobile terminal 32 in the communication coverage area 41C of the directional antenna 41-3, the user can receive the service of the service providing system 21.

When the authentication information is requested within the communication coverage area 41AB of the directional antennas 41-1 and 41-2, the mobile terminal 32 may transmit detection information from the sensor 109 to the communication apparatuses 31-1 and 31-2. In this way, a further special service may be provided in response to the detection information in the service providing system 21.

Another process of the service providing system 21 of FIG. 4 is described below with reference to a flowchart of FIG. 10.

Figure 9:
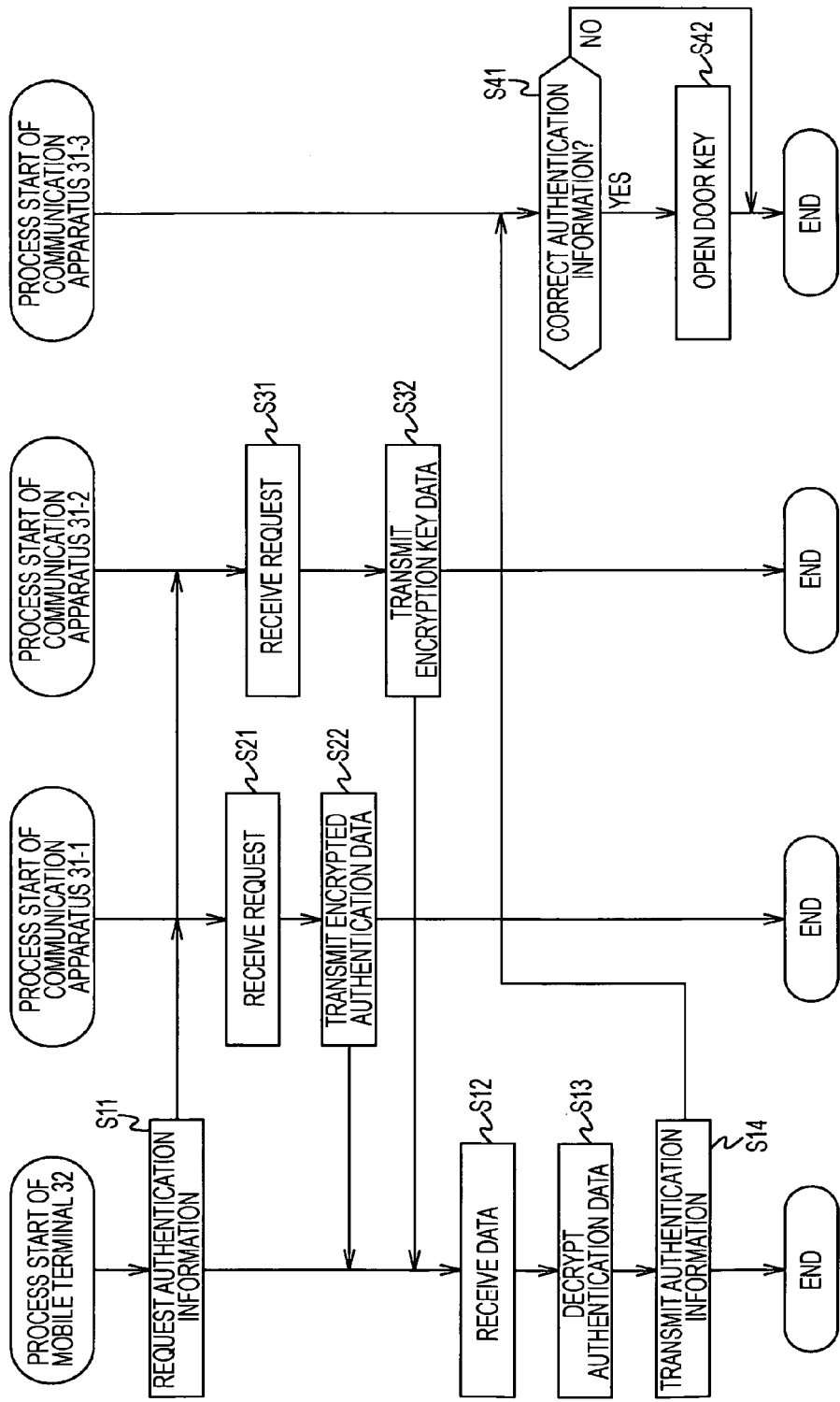
FIG. 9 is a flowchart illustrating one process of the service providing system of FIG. 4.
Figure 10:
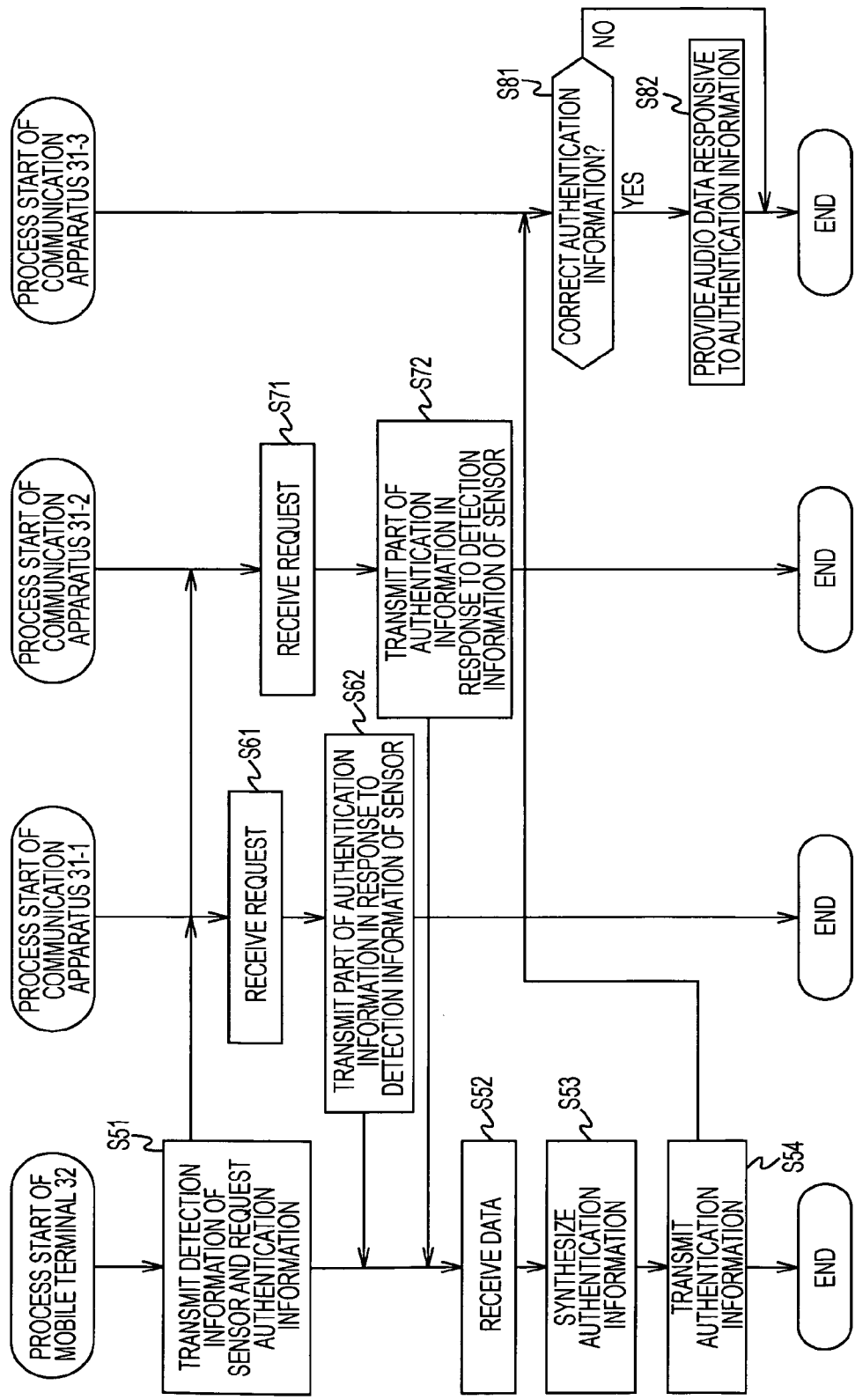
FIG. 10 is a flowchart illustrating another process of the service providing system of FIG. 4.

Referring to FIG. 10, steps identical to those discussed with reference to FIG. 9 are omitted as appropriate.

As shown in FIG. 10, the detection information from the sensor 109 is transmitted. The user who is authenticated in response to the detection information in the service providing system 21 is provided with a music data delivery service.

To receive such a service, the user places the mobile terminal 32, within the space of the communication apparatuses 31-1 and 31-2 for a predetermined period of time, an area (i.e., the communication coverage area 41AB) where the communication coverage area 41A of the directional antenna 41-1 of the communication apparatus 31-1 and the communication coverage area 41B of the directional antenna 41-2 of the communication apparatus 31-2 overlap each other.

The user performs on the mobile terminal 32 a predetermined action preset in the service providing system 21. For example, the user turns the mobile terminal 32 three times clockwise, and then five times counterclockwise. The sensor 109 detects the action performed on the mobile terminal 32, and supplies the CPU 51 with information detected in response.

The radio communication units 58 of the communication apparatuses 31-1 and 31-2 transmit calling radio waves to the communication coverage area 41A and the communication coverage area 41B via the directional antennas 41-1 and 41-2, respectively.

The radio communication unit 108 in the mobile terminal 32 present within the communication coverage area 41AB receives radio waves from the communication apparatuses 31-1 and 31-2, and notifies the authentication processing controller 131 of the reception of the radio waves. In step S51, the authentication processing controller 131 controls the radio communication unit 108, thereby causing the radio communication unit 108 to transmit the detection information from the sensor 109 to the communication apparatuses 31-1 and 31-2 via the communication antenna 42 and to request the authentication information.

In step S61, the radio communication unit 58 in the communication apparatus 31-1 receives the request for the authentication information and the detection information of the sensor 109 from the mobile terminal 32 via the directional antenna 41-1, and supplies the received signals to the CPU 51. Processing proceeds to step S62.

The service to be provided in response to the predetermined action is set up beforehand in the service providing system 21. To receive the service, the authentication information preset for the predetermined action is required. In this case, the authentication information is segmented into a plurality of blocks between the communication apparatuses 31-1 and 31-2, and blocks to be transmitted by respective communication apparatuses 31-1 and 31-2 are preset.

In response to the request from the mobile terminal 32, the CPU 51 in the communication apparatus 31-1 supplies the radio communication unit 58 with a portion of the authentication information responsive to the detection information (responsive to the predetermined action). In step S62, the radio communication unit 58 transmits the portion of the authentication information responsive to the detection information of the sensor 109 to the mobile terminal 32 present within the communication coverage area 41A (containing the communication coverage area 41AB) via the directional antenna 41-1.

In step S71, the radio communication unit 58 in the communication apparatus 31-2 receives the request for the authentication information and the detection information of the sensor 109 from the mobile terminal 32 via the directional antenna 41-2 and supplies the received information to the CPU 51. Processing proceeds to step S72.

In response to the request from the mobile terminal 32, the CPU 51 in the communication apparatus 31-2 supplies the radio communication unit 58 with a portion of the authentication information responsive to the detection information (the remaining portion of the authentication information, namely the portion not transmitted by the communication apparatus 31-1). In step S72, the radio communication unit 58 transmits to the mobile terminal 32 present within the communication coverage area 41B (containing the communication coverage area 41AB) the portion of the authentication information responsive to the detection information of the sensor 109 via the directional antenna 41-2.

In step S52, the radio communication unit 108 in the mobile terminal 32 receives via the communication antenna 42 the one portion of the authentication information from the communication apparatus 31-1 and the other portion of the authentication information from the communication apparatus 31-2, and supplies the authentication processing controller 131 with the authentication information. Processing proceeds to step S53.

In step S53, the authentication processing controller 131 controls the data processor 132, thereby causing the data processor 132 to synthesize the two portions into the authentication information, and to acquire the authentication information. The data processor 132 supplies the authentication data transmitter 133 with the acquired authentication information. Processing proceeds to step S54.

The above-mentioned acquisition process of the authentication information is performed by the mobile terminal 32, and the communication apparatuses 31-1 and 31-2 within a predetermined period of time. When the predetermined period of time has elapsed, the user enters the space where the communication apparatus 31-3 is arranged, and places the mobile terminal 32 in the communication coverage area 41C of the directional antenna 41-3 of the communication apparatus 31-3 for a constant duration of time.

The radio communication unit 58 in the communication apparatus 31-3 transmits calling radio wave requesting the authentication information to the communication coverage area 41C from the directional antenna 41.

The radio communication unit 108 in the mobile terminal 32 receives the calling radio wave from the communication apparatus 31-3 via the communication antenna 42, and notifies the authentication processing controller 131 of the reception of the calling radio wave. In step S54, the authentication processing controller 131 controls the authentication data transmitter 133, thereby causing the authentication data transmitter 133 to transmit the authentication information via the radio communication unit 108 and the communication antenna 42.

The radio communication unit 58 in the communication apparatus 31-3 receives the authentication information from the mobile terminal 32 via the directional antenna 41-3, and supplies the received authentication information to the CPU 51. The CPU 51 determines in step S81 whether the authentication information is correct one. If it is determined in step S81 that the authentication information is correct one, processing proceeds to step S82. The user is thus provided with the service of the service providing system 21. In this case, the audio data responsive to the authentication information is provided (delivered).

If the expiration time of the authentication information has passed (i.e., if time longer than the expiration time has elapsed since the transmission of the authentication information from the communication apparatuses 31-1 and 31-2), the CPU 51 in the communication apparatus 31-3 determines in step S81 that the authentication information from the mobile terminal 32 is not correct one, and step S82 is skipped. The user is not provided with the service of the service providing system 21.

The sensor 109 in the mobile terminal 32 detects the action performed on the mobile terminal 32 within the communication coverage area 41AB and detection information is transmitted. The authentication information responsive to the detection information is acquired. The service different dependent on the action detected within the communication coverage area 41AB is provided.

The information for receiving different services is not limited to the information detected by the sensor 109. The user may operate the operation unit 105 within the communication coverage area 41AB, and enter an identifier and a password to be transmitted to the communication apparatuses 31-1 and 31-2.

In the above discussion, the communication apparatuses 31-1 and 31-2 encrypt the authentication information and transmits the encrypted authentication information to the mobile terminal 32 or segments the authentication information into blocks and transmits the blocks to the communication apparatuses 31-1 and 31-2. The present invention is not limited to these methods. Any other method is acceptable as long as data communication is performed with each of the communication apparatuses 31-1 and 31-2 so that the authentication information is obtained within a predetermined period of time.

In another method, a signal (beacon signal) transmitted from the communication apparatus 31 to each of the communication apparatuses 31-1 and 31-2 may be observed at regular intervals. If the beacon signals received by the communication apparatuses 31-1 and 31-2 are above a predetermined threshold, the mobile terminal 32 is determined to be within the communication coverage area 41AB, and one of the communication apparatuses 31-1 and 31-2 then transmits the authentication information.

To use beacon signal from the mobile terminal 32, the communication apparatuses 31-1 and 31-2 need to learn beforehand the output power of the mobile terminal 32.

In the service providing system 21 of FIG. 4, the two communication apparatuses 31-1 and 31-2 transmit the authentication information. The number of apparatuses is not limited to two and may be three, or more. In such a case, communication coverage areas of the plurality of communication apparatuses are used.

In the service providing system 21 of FIG. 4, the communication apparatus 31-3 authenticates the mobile terminal 32 and permits the service to be provided to the user. When service providing is permitted, a plurality of communication apparatuses may have the right to permit the user of service in the same manner as when the authentication information is provided. In such a case as well, communication coverage areas of the plurality of communication apparatuses are used.

Figure 11:
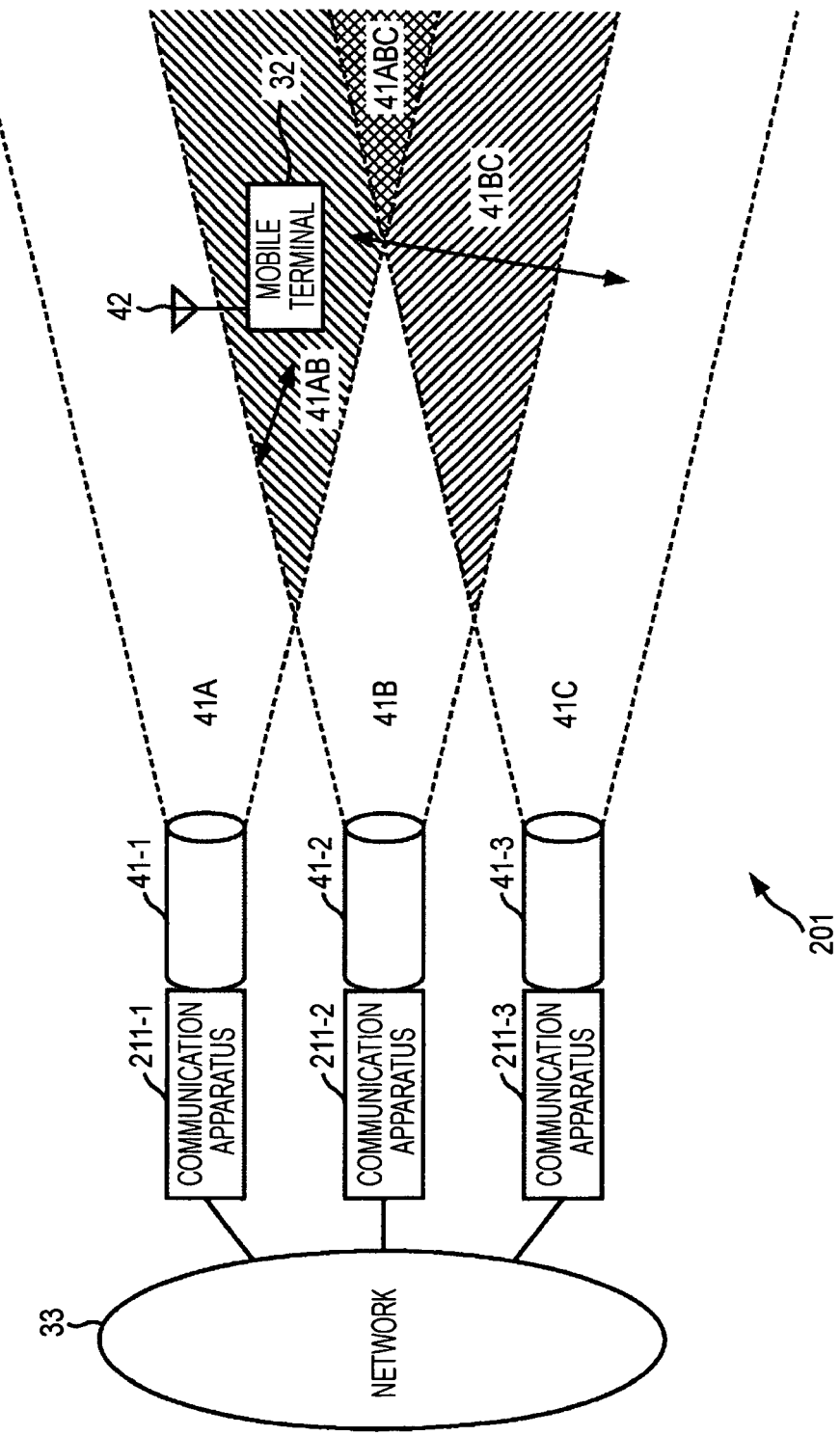
FIG. 11 illustrates another configuration of the service providing system in accordance with one embodiment of the present invention.

FIG. 11 illustrates an inventive service providing system 201. Elements identical to those discussed with reference to FIG. 4 are designated with the same reference numerals and the discussion thereof is omitted as appropriate.

As in the communication apparatus 31 of FIG. 4, communication apparatuses 211-1 through 211-3 are provided with directional antennas 41-1 through 41-3 in the service providing system 201. Using the directional antennas 41-1 through 41-3, the communication apparatuses 211-1 through 211-3 radio communicate with the mobile terminal 32 present in each of the communication coverage areas 41A through 41C of the directional antennas 41-1 through 41-3.

As the communication apparatus 31 of FIG. 4, the communication apparatuses 211-1 through 211-3 are connected to the network 33 using communications other than the radio communications using the directional antennas 41-1 through 41-3, and exchange predetermined data.

In the service providing system 201, contents supplied by the communication apparatuses 211-1 through 211-3 are managed by a server (not shown) connected to the network 33. The communication apparatuses 211-1 through 211-3 connected to the network 33 may be considered as a single service providing apparatus.

The communication apparatuses 211-1 through 211-3 are arranged in a predetermined space so that the following communication coverage areas are formed: a communication coverage area 41AB where the communication coverage area 41A of the directional antenna 41-1 and the communication coverage area 41B of the directional antenna 41-2 overlap each other, a communication coverage area 41BC where the communication coverage area 41B of the directional antenna 41-2 and the communication coverage area 41C of the directional antenna 41-3 overlap each other, and a communication coverage area 41ABC where the communication coverage area 41A of the directional antenna 41-1, the communication coverage area 41B of the directional antenna 41-2 and the communication coverage area 41C of the directional antenna 41-3 overlap each other. Using the directional antennas 41-1 through 41-3, the communication apparatuses 211-1 through 211-3 deliver data of a predetermined content to the mobile terminal 32 of the user who receives the service of the service providing system 201.

The communication apparatuses 211-1 through 211-3 deliver audio data, still-image data, and moving-image data as the data of contents at high quality and degraded quality.

The data delivered may be at one of the high quality and the degraded quality. The data delivered may not be a combination of the audio data, the still-image data, and the moving-image data or may additionally contain other types of data. The other types of data may contain content-assisting information for assisting a user in hearing and viewing delivered data, such as menu information displayed on a screen of the mobile terminal 32 and encode information for reproducing correctly the content.

If there is no need for distinguishing between the communication apparatuses 211-1 through 211-3, each of the communication apparatuses 211-1 through 211-3 is referred to as a communication apparatus 211. The number of communication apparatuses 211 is not limited to three. Two or more communication apparatuses 211 may be employed. The geometry of the arrangement of the communication apparatuses 211 is not limited to the one of FIG. 11.

The communication apparatus 211 has the same structure as the communication apparatus 31 of FIGS. 4 and 5. The communication apparatus 211 is also discussed with reference to FIG. 5.

The mobile terminal 32 having the communication antenna 42 is carried by the user, and placed in the particular area within the space to communicate with the communication apparatus 211 in the predetermined area as the communication coverage area thereof.

The mobile terminal 32 carried by the user and placed in each communication coverage area receives data of contents transmitted by the communication apparatus 211 having the area as the communication coverage area. Depending on the number of received contents, the mobile terminal 32 generates display signals and audio signals of the data of the received contents, and outputs corresponding video on the LCD 112 and corresponding audio from the loudspeaker 113.

For example, when the mobile terminal 32 present in one of the communication coverage areas 41A, 41B, and 41C receives data of a content from a corresponding single communication apparatus 211, the video and audio of the single content are output to the LCD 112 and the loudspeaker 113, respectively.

When the mobile terminal 32 present within one of the communication coverage areas 41AB and 41BC receives data of contents from corresponding two communication apparatuses 211, the video of the two contents and the audio of one content are output to the LCD 112 and the loudspeaker 113, respectively.

When the mobile terminal 32 present within the communication coverage area 41ABC receives contents from the three communication apparatuses 211, the video of the three contents and the audio of any one of the three contents are output to the LCD 112 and the loudspeaker 113, respectively.

The data of the contents received by the mobile terminal 32 becomes different depending on the area in the space in the service providing system 201 of FIG. 11. More specifically, the service providing system 201 provides different services depending on the area where the mobile terminal 32 carried by the user is present.

The user can thus enjoy the service responsive to the position of the user by simply carrying the mobile terminal 32 and moving to a predetermined area. The service providing system 201 thus provides the user with ambient services.

Figure 12:
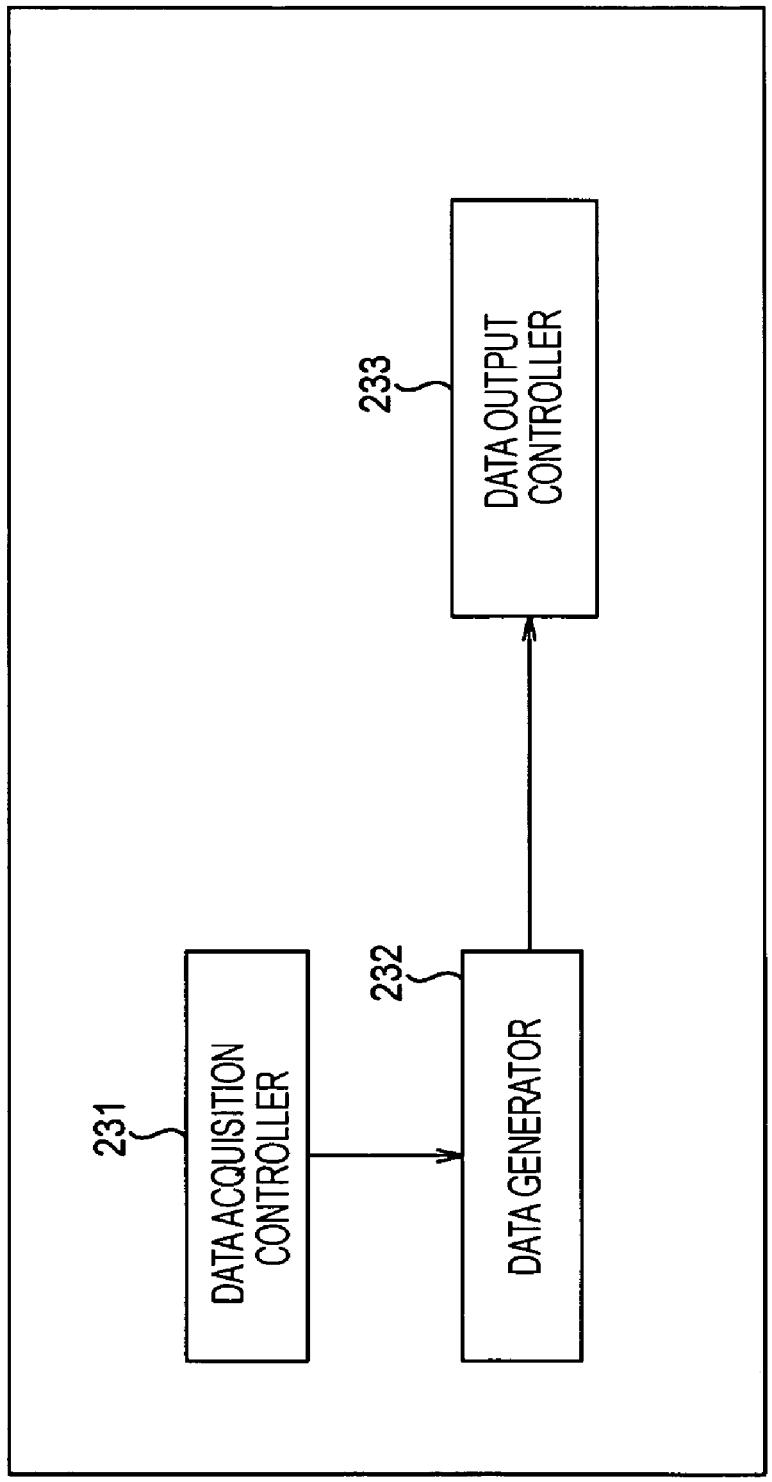
FIG. 12 is a block diagram illustrating a mobile terminal of FIG. 11.

FIG. 12 is a functional block diagram of the mobile terminal 32 in the service providing system 201 of FIG. 11. The functional block diagram of FIG. 12 is embodied when the CPU 101 performs a predetermined program.

A data acquisition controller 231 controls a data generator 232 in response to contents (such as the number of contents, type of data forming the contents, or metadata attached to each content) received from the communication apparatus 211 via the radio communication unit 108. The data acquisition controller 231 thus causes the data generator 232 to generate a display signal and an audio signal from the data of the received contents.

The data generator 232 under the control of the data acquisition controller 231 generates a display signal by superimposing predetermined still-image data and moving-image data of a received content, and outputs the generated display signal to a data output controller 233. The data generator 232 under the control of the data acquisition controller 231 generates an audio signal by synthesizing predetermined audio data from the data of the received content or by simply extracting predetermined audio data, and outputs the generated audio data to the data output controller 233.

The data output controller 233 outputs the display signal generated by the data generator 232 to the video signal processor 110. The data output controller 233 controls the video signal processor 110 to display the corresponding image on the LCD 112. The data output controller 233 furthermore outputs the audio signal generated by the audio signal processor 111. The data output controller 233 controls the audio signal processor 111 to output a corresponding audio from the loudspeaker 113.

The process of the service providing system 201 of FIG. 11 is described below with reference FIG. 13 and a flowchart of FIG. 14.

Figure 13:
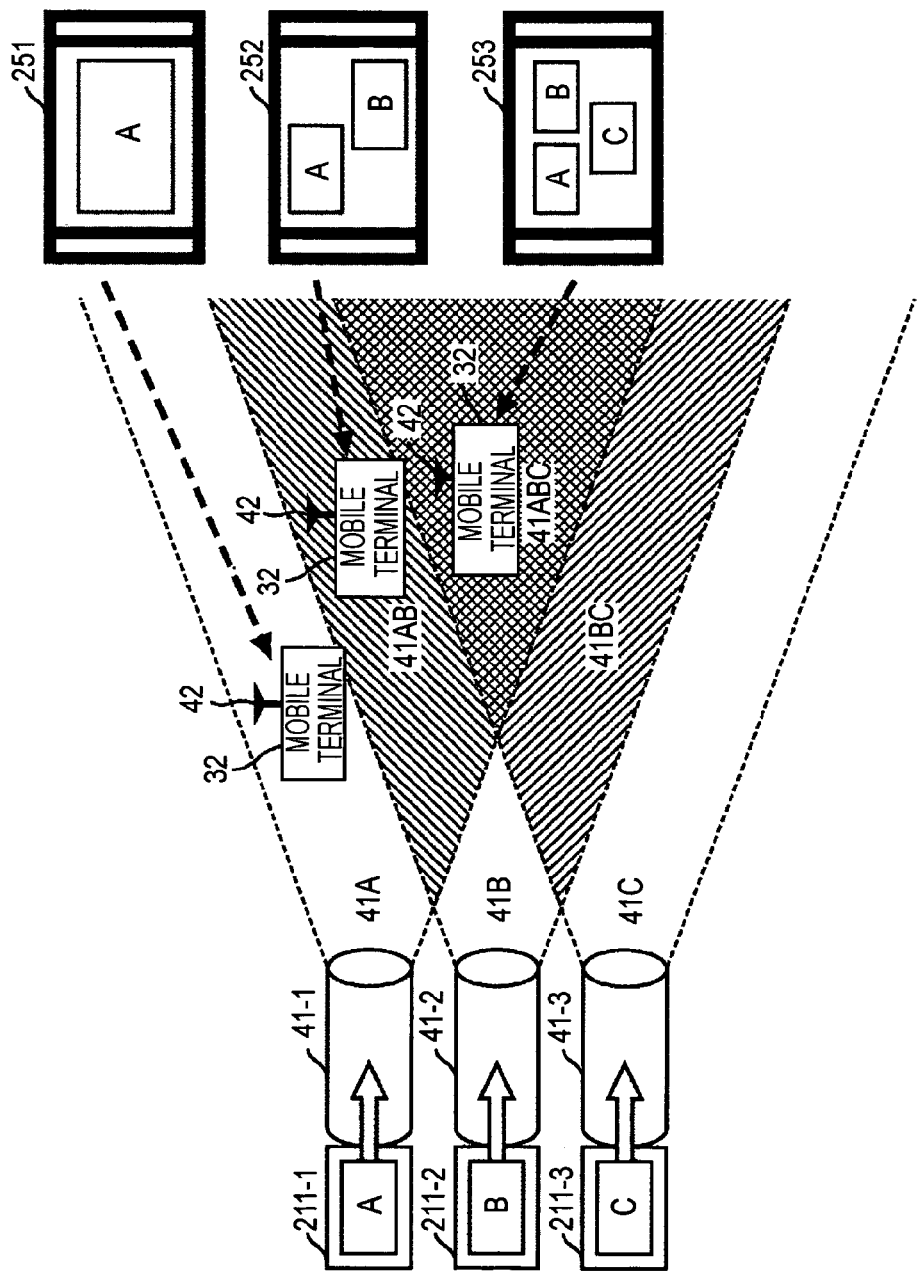
FIG. 13 illustrates services provided by the service providing system of FIG. 11.

In the service providing system 201 of FIG. 13, the communication apparatus 211-1 delivers to the mobile terminal 32 moving-image data, still-image data, and audio data of a content, A, the communication apparatus 211-2 delivers to the mobile terminal 32 moving-image data, still-image data, and audio data of a content B, and the communication apparatus 211-3 delivers to the mobile terminal 32 moving-image data, still-image data, and audio data of a content C.

Figure 14:
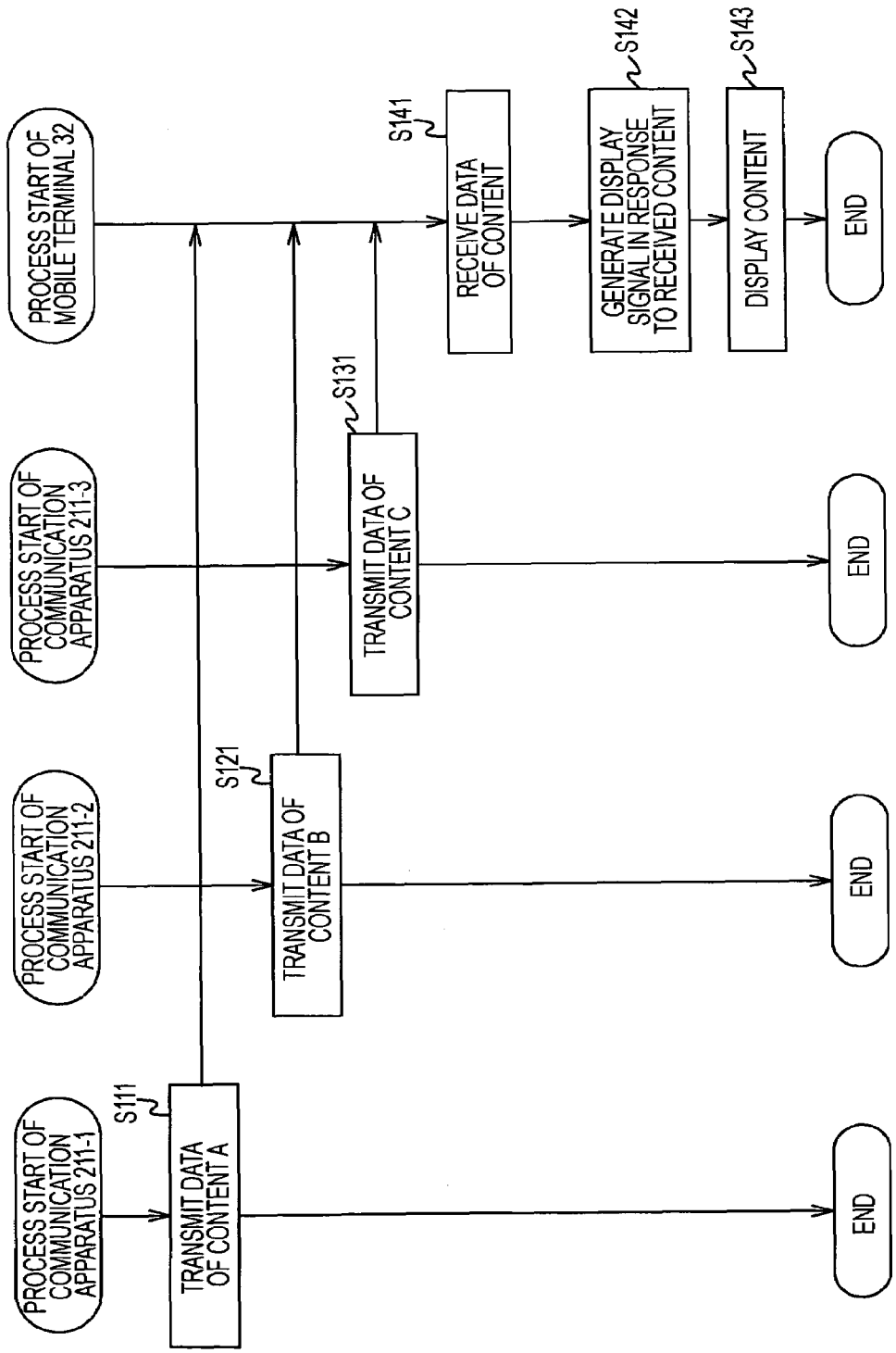
FIG. 14 is a flowchart of one process of the service providing system of FIG. 11.

In step S111 of FIG. 14, the radio communication unit 58 of the communication apparatus 211-1 transmits the data of the content A (the moving-image data, the still-image data, and the audio data) to the communication coverage area 41A (containing the communication coverage area 41AB and the communication coverage area 41ABC) from the directional antenna 41-1.

In step S121, the radio communication unit 58 of the communication apparatus 211-2 transmits the data of the content B (the moving-image data, the still-image data, and the audio data) to the communication coverage area 41B (containing the communication coverage area 41AB, the communication coverage area 41BC, and the communication coverage area 41ABC) from the directional antenna 41-2.

In step S131, the radio communication unit 58 of the communication apparatus 211-3 transmits the data of the content C (the moving-image data, the still-image data, and the audio data) to the communication coverage area 41C (containing the communication coverage area 41BC and the communication coverage area 41ABC) from the directional antenna 41-3.

To receive the service of the service providing system 201, the user carrying the mobile terminal 32 moves to a communication coverage area where a desired content can be received from among the communication coverage areas of the communication apparatuses 211-1 through 211-3.

In step S141, the radio communication unit 108 in the mobile terminal 32 staying within the communication coverage area desired by the user receives via the communication antenna 42 the data of the content transmitted from the directional antenna 41 of the communication apparatus 211 having the area as the communication coverage area thereof, and notifies the data acquisition controller 231 of the received content. Processing proceeds to step S142.

In step S142, the data acquisition controller 231 controls the data generator 232 in response to the content received by the radio communication unit 108, thereby generating the display signal from the data of the received content. The data generator 232 generates the display signal and outputs the generated display signal to the data output controller 233. Processing proceeds to step S143.

In step S143, the data output controller 233 outputs the display signal from the video signal processor 110. The data output controller 233 controls the video signal processor 110, thereby causing the LCD 112 to display the signal responsive to the display signal. In this way, any content of the communication apparatuses 211 is thus displayed on the LCD 112.

The data acquisition controller 231 controls the data generator 232 as necessary, thereby outputting the audio signal to the loudspeaker 113 via the data output controller 233 and the audio signal processor 111.

More specifically, as shown in FIG. 13, the radio communication unit 108 in the mobile terminal 32 present within the communication coverage area 41A receives the data of the content A only (the moving-image data, the still-image data, and the audio data) from the directional antenna 41-1 of the communication apparatus 211-1.

The data acquisition controller 231 in the mobile terminal 32 determines that only the content A has been received, and controls the data generator 232, thereby generating the display signal so that the image of the moving-image data of the content A appears large. The data acquisition controller 231 then generates the audio signal responsive to the audio data of the content A.

Under the control of the data output controller 233, the display signal is output to the LCD 112 via the video signal processor 110. Under the control of the data output controller 233, the audio signal is output to the loudspeaker 113 via the audio signal processor 111.

As shown in FIG. 13, a screen 251 of an image responsive to the moving-image data of the content A is displayed on the LCD 112 in the mobile terminal 32 present within the communication coverage area 41A. A sound responsive to the audio data of the content A is output from the loudspeaker 113 of the mobile terminal 32.

For example, the radio communication unit 108 in the mobile terminal 32 present within the communication coverage area 41A receives the data of the content A (the moving-image data, the still-image data, and the audio data) from the directional antenna 41-1 of the communication apparatus 211-1 and the data of the content B from the directional antenna 41-2 of the communication apparatus 211-2.

The data acquisition controller 231 in the mobile terminal 32 determines that both the content A and the content B have been received. The data acquisition controller 231 then controls the data generator 232, thereby generating the display signal with two units of the moving-image data superimposed to each other so that the image of the moving-image data of the content A and the image of the moving-image data of the content B are displayed in a juxtaposed position. The audio signal corresponding to the audio data of one of the content A and the content B is generated.

Under the control of the data output controller 233, the display signal is output to the LCD 112 via the video signal processor 110. Under the control of the data output controller 233, the audio signal is output to the loudspeaker 113 via the audio signal processor 111.

As shown in FIG. 13, a screen 252 composed of two juxtaposed images of still-image data of the content A and the content B is displayed on the LCD 112 in the mobile terminal 32 present within the communication coverage area 41AB. A sound responsive to the audio data of the content B is output from the loudspeaker 113 in the mobile terminal 32.

The radio communication unit 108 in the mobile terminal 32 present within the communication coverage area 41ABC receives the data of the content A (the moving-image data, the still-image data, and the audio data) from the directional antenna 41-1 of the communication apparatus 211-1, the data of the content B from the directional antenna 41-2 of the communication apparatus 211-2, and the data of the content C from the directional antenna 41-3 of the communication apparatus 211-3.

The data acquisition controller 231 in the mobile terminal 32 determines that the content A, the content B and the content C have been received. The data acquisition controller 231 controls the data generator 232, thereby causing the data generator 232 to generate the display signal with three units of still-image data thereof superimposed to each other so that the image of the still-image data of the content A, the image of the still-image data of the content B, and the image of the still-image data of the content C are displayed in a juxtaposed position. No audio signal is generated.

Under the control of the data output controller 233, the display signal is output to the LCD 112 via the video signal processor 110.

As shown in FIG. 13, a screen 253 with three juxtaposed images of the still-image data of the content A, the content B and the content C is displayed on the LCD 112 in the mobile terminal 32 present within the communication coverage area 41ABC. No sound is output from the loudspeaker 113 of the mobile terminal 32.

If only a single content is received by the mobile terminal 32, the image responsive to the moving-image data of that content is displayed while the audio data of the content is also output. The user can thus view the moving image of the content.

If only two contents are received by the mobile terminal 32, the images responsive to the moving-image data of the contents is displayed in a size smaller than when only a single content is received. The audio data of one of the two contents is output. The user can easily view the moving image of the contents and may move to an area where a desired content only is received.

If only three contents are received by the mobile terminal 32, the images responsive to the still-image data of the contents are displayed in a size smaller than when the two contents are received. The user may cursorily view the still images to know which contents are delivered, and may move to an area where only a desired content is received.

The display method of the images responsive to the data and output method of the sound are not limited to the above-referenced method and combinations. For example, both units of audio data may be output concurrently. The images responsive to three units of moving-image data may be displayed in a juxtaposed position. The layout of the images within the screen is not limited to the one of FIG. 13. Data controlling the outputting may be transmitted from the communication apparatus 211 as metadata.

As described above, the user can receive services different depending on the area where the mobile terminal 32 held by the user is placed. The user can thus receive the service responsive to a position within an area by simply carrying the mobile terminal 32 and moving to the position in the desired area.

Figure 15:
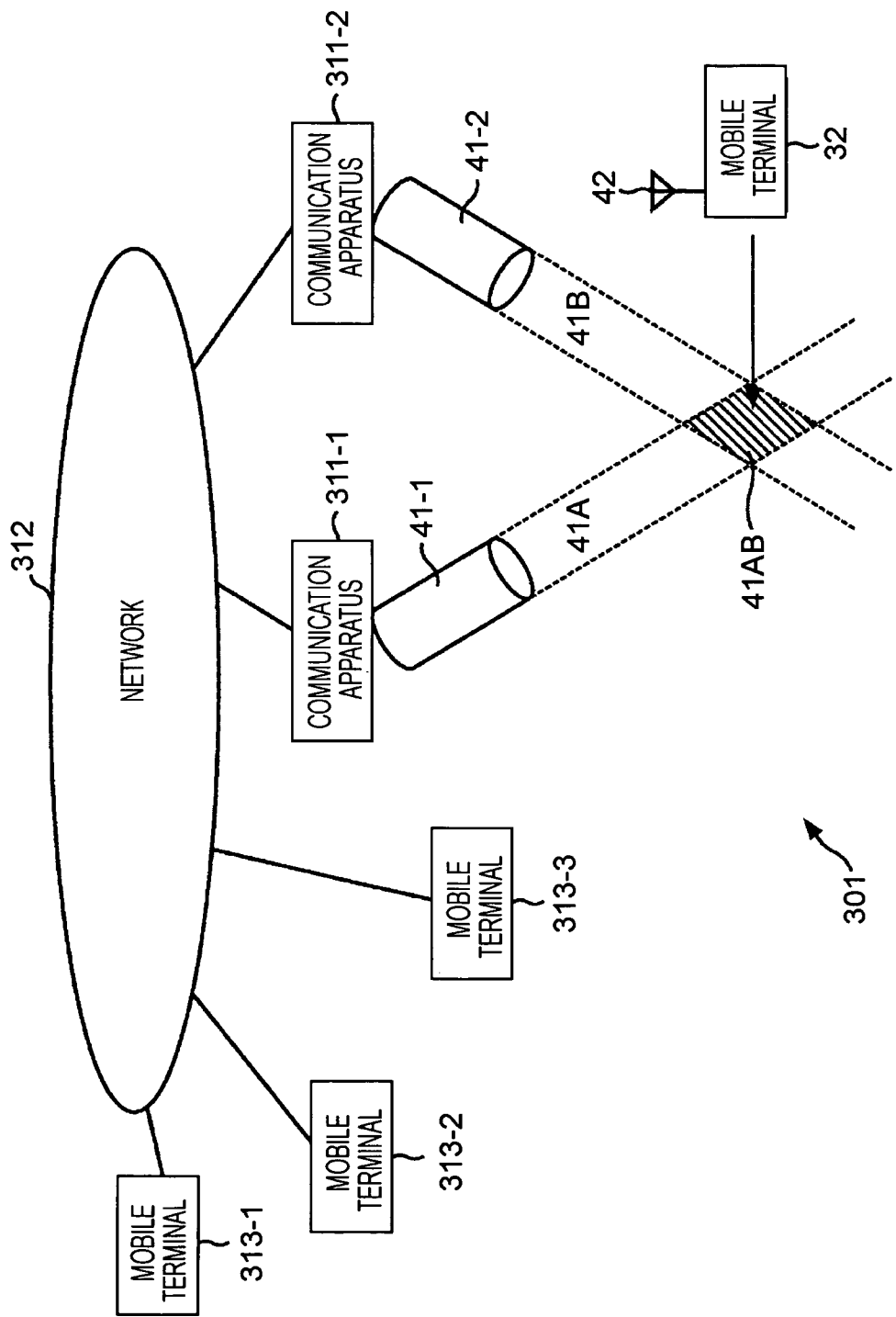
FIG. 15 illustrates yet another configuration of the service providing system of FIG. 4.

FIG. 15 illustrates a service providing system 301 of one embodiment of the present invention. The service providing system 301 of FIG. 15 is similar to the service providing system 21 of FIG. 4 and elements corresponding to elements of FIG. 4 are designated with the same reference numerals and the discussion thereof is omitted as appropriate.

As the communication apparatus 31 of FIG. 4, the service providing system 301 includes communication apparatuses 311-1 through 311-2 provided with directional antennas 41-1 and 41-2. Using the directional antennas 41-1 and 41-2, the communication apparatuses 311-1 through 311-2 radio communicate with the mobile terminal 32 present within the communication coverage areas 41A and 41B of the directional antennas 41-1 and 41-2.

The communication apparatuses 311-1 through 311-2 is connected to a network 312 for communications other than the radio communications using the directional antennas 41-1 and 41-2, and exchanges predetermined data.

The network 312 is a radio LAN (Local Area Network). Alternatively, the network 312 may be a wired network. Communications between the communication apparatuses 31-1 and 31-2 are secured using encryption technique.

As shown in FIG. 15, the network 312 also connects to mobile terminals 313-1 through 313-3.

As the communication apparatuses 31-1 and 31-2 of FIG. 4, the communication apparatuses 311-1 through 311-2 are arranged within a predetermined space so that the communication coverage area 41A of the directional antenna 41-1 and the communication coverage area 41B of the directional antenna 41-2 overlap each other. Using the directional antennas 41-1 and 41-2, the communication apparatuses 311-1 through 311-2 transmit data serving as authentication information required by the mobile terminal 32 of the user who may wish to receive the service of the service providing system 301.

The communication apparatus 311-1 also performs the process of the communication apparatus 31-3 of FIG. 4. More specifically, the communication apparatus 311-1 performs the authentication process on the mobile terminal 32 of the user who receives the service of the service providing system 301 and starts providing the service of the service providing system 301 to the mobile terminal 32, which has been authenticated through the authentication process.

With reference to FIG. 15, the mobile terminal 32 is connected to the network 312. The mobile terminal 32 transmits still-image data of its own to the other mobile terminals 313-1 through 313-3 via the network 312. The still-image data is then output from the mobile terminals 313-1 through 313-3.

The mobile terminal 32 within the communication coverage area 41AB exchanges data with the communication apparatuses 311-1 through 311-2 having the communication coverage area 41AB. The mobile terminal 32 performs data processing on the obtained data, such as decryption or synthesis, thereby obtaining the authentication information. The mobile terminal 32 then transmits the obtained authentication information to the communication apparatus 311-1 to be authenticated by the communication apparatus 311-1.

In this way, the mobile terminal 32 or the user holding the mobile terminal 32 can receive the service of the service providing system 301.

Each of the mobile terminals 313-1 through 313-3 has the same structure as the mobile terminal 32, and receives data of contents supplied from apparatuses (for example, the communication apparatuses 311-1 through 311-2 and the other mobile terminal 313) connected to the network 312, and displays an image responsive to the received image data.

The mobile terminals 313-1 through 313-3, if permitted to be connected to the network 312 of the mobile terminal 32, receives data from the mobile terminal 32 via the network 312.

As the service providing system 21 of FIG. 4, in the service providing system 301 of FIG. 15, the mobile terminal can receive the service of being connected to the network 312 and exchanging information with apparatuses and terminals connected to the network 312 on the premise that the mobile terminal held by the user stays in a predetermined area (i.e., the communication coverage area 41AB) for a predetermined period of time.

The communication apparatuses 311-1 through 311-2 connected to the network 312 as shown in FIG. 15 are considered as a single service providing apparatus as the mobile terminals 31-1 through 31-3 connected to the network 33 of FIG. 4.

If there is no need for distinguishing between the communication apparatuses 311-1 through 311-2, each of the communication apparatuses 311-1 through 311-2 is simply referred to as a communication apparatus 311. If there is no need for distinguishing between the mobile terminals 313-1 through 313-3, each of the mobile terminals 313-1 through 313-3 is simply referred to as a mobile terminal 313.

The mobile terminal 313 has the same structure as the mobile terminal 32 of FIGS. 3 and 6. The mobile terminal 313 is described below with reference to FIG. 6. The functional block diagram of the mobile terminal 313 of FIG. 12 is performed when the CPU 101 performs a predetermined program. The functional block diagram of FIG. 12 is also applicable to the mobile terminal 313.

Figure 16:
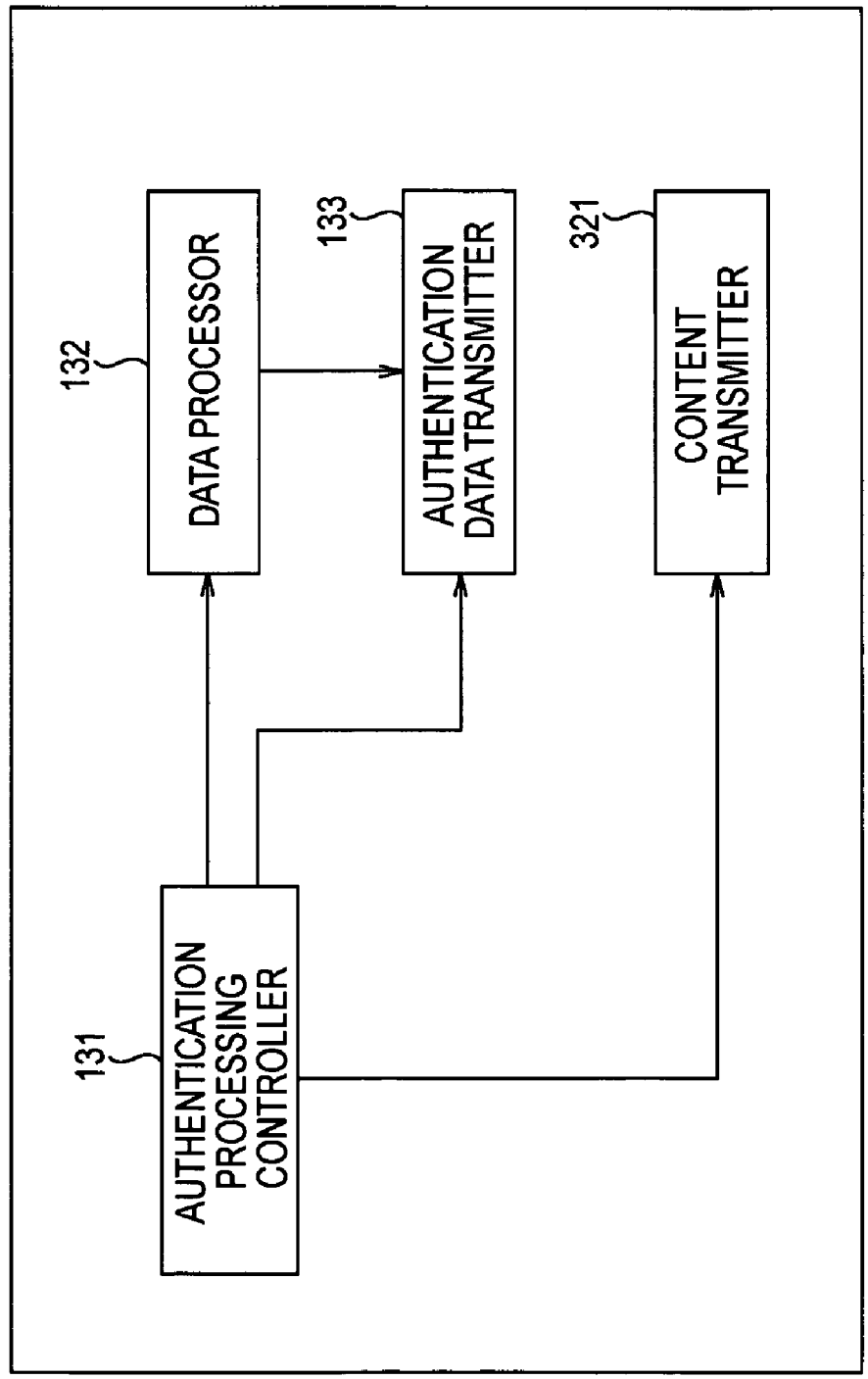
FIG. 16 is a functional block diagram of a mobile terminal of FIG. 15.

FIG. 16 is a functional block diagram of the mobile terminal 32 in the service providing system 301 of FIG. 15. The functional block diagram of FIG. 16 is performed when the CPU 101 performs a predetermined program. The functional block diagram of FIG. 16 is different from the functional block diagram of FIG. 7 in that a network 321 is added. The rest of the mobile terminal 32 is generally identical to the mobile terminal 32 of FIG. 7.

The authentication processing controller 131 issues a request for the authentication information to the communication apparatus 311 via the radio communication unit 108 and controls the data processor 132 and the authentication data transmitter 133. When the communication apparatus 311 notifies the mobile terminal 32 of authentication, the authentication processing controller 131 controls the content transmitter 321, thereby transmitting via the radio communication unit 108 the data of the content currently being viewed (displayed) by the mobile terminal 32.

The content transmitter 321 under the control of the authentication processing controller 131 transmits the data of the content currently viewed by the mobile terminal 32 to the communication apparatus 311 via the radio communication unit 108 and the communication antenna 42.

The service provided by the service providing system 301 of FIG. 15 is described below with reference to FIGS. 17 and 18. The directional antenna 41 of the communication apparatus 311 is shown but the communication apparatus 311 is not shown in FIGS. 17 and 18.

Figure 17:
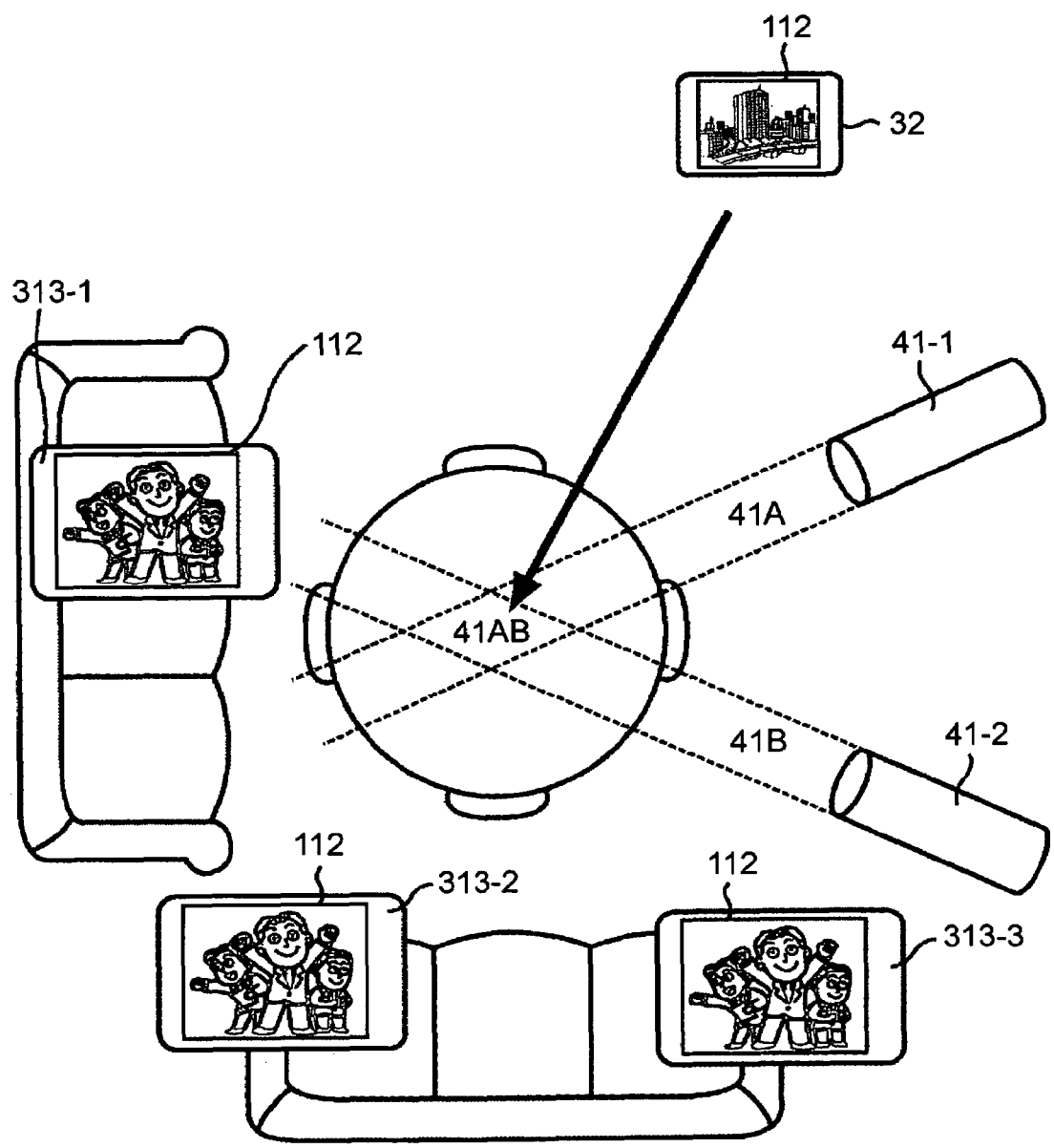
FIG. 17 illustrates services provided by the service providing system of FIG. 15.

Referring to FIG. 17, the directional antennas 41-1 and 41-2 (the communication apparatuses 311-1 and 311-2) are arranged within a room (space). Users (not shown) holding the mobile terminals 313-1 through 313-3 are sitting down on sofas around a table.

The mobile terminals 313-1 through 313-3 and the communication apparatuses 311-1 through 311-2 are connected to the network 312 of FIG. 5. The mobile terminals 313-1 through 313-3 receive via the network 312 video data of contents stored on the storage unit 57 of the communication apparatus 311-1, and display images of corresponding "friends" on the respective LCDs 112 of the mobile terminals 313-1 through 313-3.

The mobile terminal 32 carried by the user displays an image of a "background" responsive to the image data of the content stored on the storage unit 106.

The user places the mobile terminal 32 at the center area of the table centered in the room for a predetermined period of time. The center area of the table serves as an area (the communication coverage area 41AB) where the communication coverage area 41A of the directional antenna 41-1 of the communication apparatus 311-1 and the communication coverage area 41B of the directional antenna 41-2 of the communication apparatus 311-2 overlap each other.

As previously discussed with reference to FIGS. 8 and 9, when the mobile terminal 32 issues a request for authentication information, the communication apparatus 311-1 transmits encrypted authentication data to the mobile terminal 32, and the communication apparatus 311-2 transmits encryption key data to the mobile terminal 32.

The communication apparatus 311-1 having transmitted the encrypted authentication data requests the authentication information via the directional antenna 41-1. The mobile terminal 32 decrypts the authentication data that has been encrypted with the encryption key data, obtains the authentication information, and transmits the obtained authentication information via the radio communication unit 108 and the communication antenna 42.

In response to the authentication information from the mobile terminal 32, the communication apparatus 311-1 authenticates the mobile terminal 32, and provides the service to the mobile terminal 32. As shown in FIG. 17, the communication apparatus 311-1 permits the mobile terminal 32 to be connected to the network 312 by notifying the mobile terminal 32 and the apparatuses connected to the network 312 that the mobile terminal 32 has been authenticated. In this way, the mobile terminal 32 can communicate via the network 312 with the apparatuses connected to the network 312.

More specifically, as shown in FIG. 17, the mobile terminal 32 transmits the video data of a currently displayed content (hereinafter simply referred to as video data) via the radio communication unit 108 and the communication antenna 42 in response to the notification of authentication from the communication apparatus 311-1. The communication apparatus 311-2 receives the video data from the mobile terminal 32 via the directional antenna 41 and the radio communication unit 58. The communication apparatus 311-2 transmits via the communication unit 56 the received data to the mobile terminals 313-1 through 313-3 connected to the network 312.

Upon receiving the video data from the communication apparatus 311-2 via the communication antenna 42 and the radio communication unit 108, the mobile terminals 313-1 through 313-3 display the image responsive to the received video data on the LCDs 112 thereof.

Figure 18:
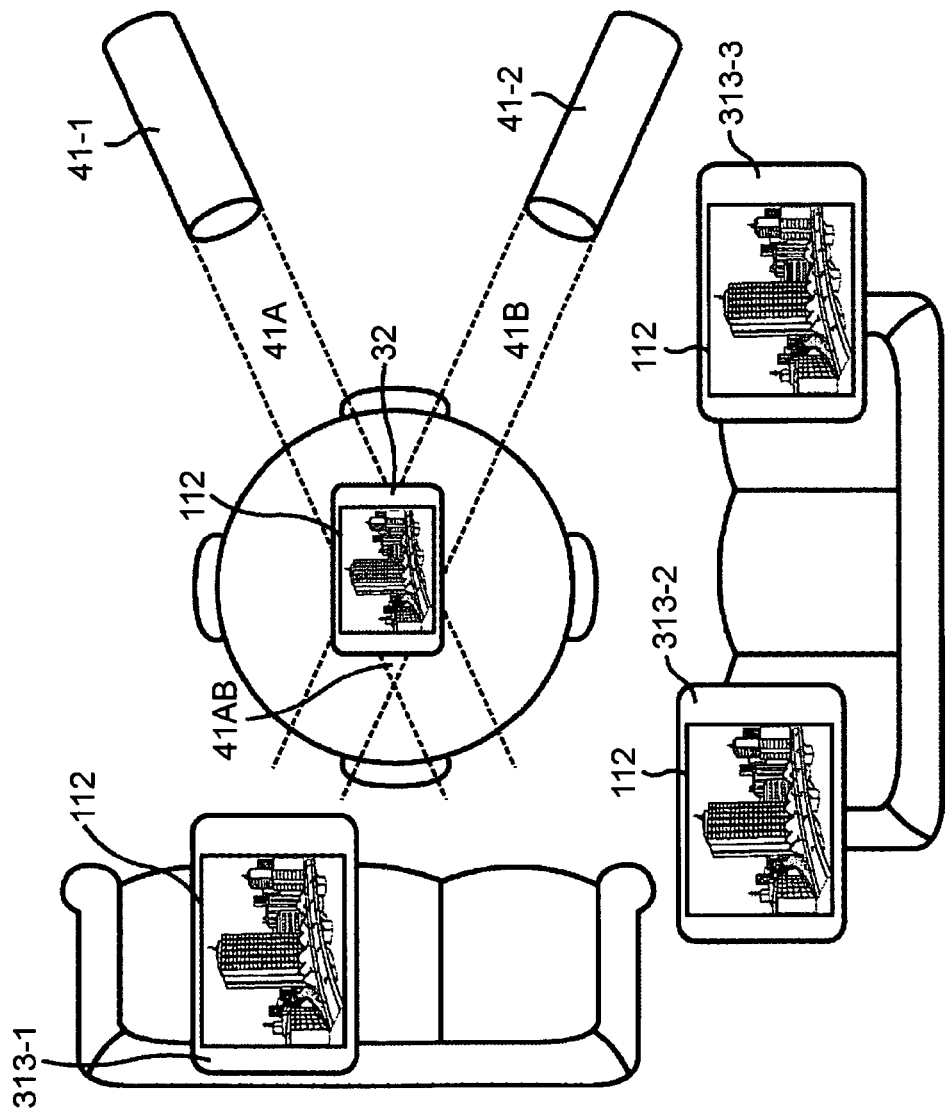
FIG. 18 illustrates services provided by the service providing system of FIG. 15.

As shown in FIG. 18, the same "background" image as the image displayed on the LCD 112 of the mobile terminal 32 is displayed on the LCDs 112 of the mobile terminals 313-1 through 313-3.

In the above discussion, the mobile terminal 32 transmits the video data to the mobile terminals 313-1 through 313-3 via the communication apparatus 311-2. Alternatively, the mobile terminal 32 may transmit the video data via the communication apparatus 311-1, and may be permitted to be connected to the network 312. The mobile terminal 32 may thus transmit the video data directly to the mobile terminals 313-1 through 313-3 via the network 312.

The process of the service providing system 301 of FIG. 15 is described below with reference to a flowchart of FIG. 19.

With reference to FIG. 17, the communication apparatuses 311-1 through 311-2 arranged in the room (space) and the mobile terminals 313-1 through 313-3 held by the users staying in the room are connected to the network 312 of FIG. 15. The mobile terminals 313-1 through 313-3 receive via the network 312 the video data of the content stored on the storage unit 57 of the mobile terminal 313-1, and display the image of the corresponding "friends" on the respective LCDs 112.

The mobile terminal 32 held by the user displays the "background" image responsive to the video data of the content stored on the storage unit 106.

The mobile terminal 32 is placed in the communication coverage area 41AB in the center of the room where the communication apparatuses 311-1 through 311-2 are arranged. The mobile terminal 32 is continuously placed in the communication coverage area 41AB for a predetermined period of time.

The mobile terminal 32, and the communication apparatuses 311-1 through 311-2 perform steps S11 through S13, step S21 and step S22, and steps S31 and S32 discussed with reference to FIG. 9.

The radio communication unit 108 in the mobile terminal 32 present in the communication coverage area 41AB receives calling radio wave from the communication apparatuses 311-1 through 311-2 via the communication antenna 42. The authentication processing controller 131 controls the radio communication unit 108, thereby transmitting a request for the authentication information to the communication apparatuses 311-1 through 311-2 via the communication antenna 42.

The radio communication unit 58 in the communication apparatus 311-1 receives the request for the authentication information from the mobile terminal 32 via the directional antenna 41-1. In response to the request from the mobile terminal 32, the CPU 51 encrypts the authentication information using the encryption key data shared by the communication apparatus 311-2. The CPU 51 transmits the encrypted authentication information to the mobile terminal 32 present within the communication coverage area 41A (containing the communication coverage area 41AB) via the radio communication unit 58 and the directional antenna 41-1.

The radio communication unit 58 in the communication apparatus 311-2 also receives the request for the authentication information from the mobile terminal 32 via the directional antenna 41-2. In response to the request from the communication antenna 42, the CPU 51 transmits the encryption key data shared by the communication apparatus 311-1 to the mobile terminal 32 present within the communication coverage area 41B (containing the communication coverage area 41AB) via the radio communication unit 58 and the directional antenna 41-2.

The radio communication unit 108 in the mobile terminal 32 receives via the communication antenna 42 the encrypted authentication data from the communication apparatus 311-1 and the encryption key data from the communication apparatus 311-2. The authentication processing controller 131 controls the data processor 132, thus decrypting the authentication data using the encryption key data and thus obtaining the authentication information. The data processor 132 supplies the authentication data transmitter 133 with the obtained authentication information.

The authentication data transmitter 133 in the mobile terminal 32 is thus supplied with the authentication information.

After transmitting the encrypted authentication data via the directional antenna 41-1, the radio communication unit 58 in the communication apparatus 311-1 transmits calling radio wave requesting the authentication information toward the communication coverage area 41A (containing the communication coverage area 41AB) from the directional antenna 41.

Upon receiving the calling radio wave from the communication apparatus 311-1 via the communication antenna 42, the radio communication unit 108 in the mobile terminal 32 in the communication coverage area 41A so notifies the authentication processing controller 131.

Figure 19:
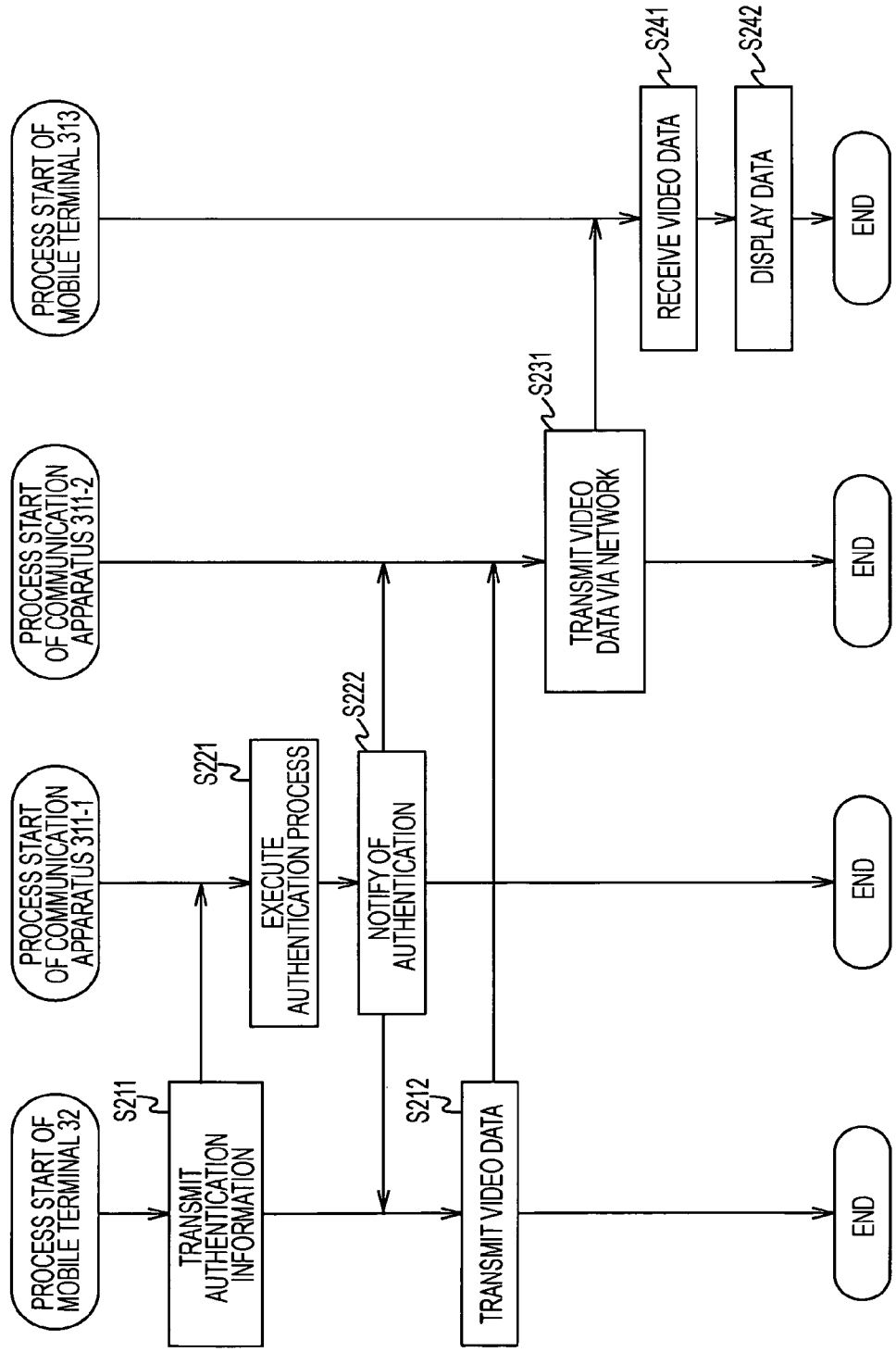
FIG. 19 is a flowchart illustrating one process of the service providing system of FIG. 15.

In step S211 of FIG. 19, the authentication processing controller 131 controls the authentication data transmitter 133, thereby transmitting the authentication information via the radio communication unit 108 and the communication antenna 42.

The radio communication unit 58 in the communication apparatus 311-1 receives the authentication information from the mobile terminal 32 via the directional antenna 41-1, and supplies the CPU 51 with the received authentication information. In step S221, the CPU 51 performs an authentication process.

The CPU 51 in the communication apparatus 311-1 determines whether the current authentication information is correct one. If it is determined that the current authentication information is correct one, processing proceeds to step S222. The CPU 51 in the communication apparatus 311-1 transmits a notification of authentication via the radio communication unit 58 and the directional antenna 41-1 while also transmitting the authentication of the mobile terminal 32 to the communication apparatus 311-2 via the communication unit 56 and the network 312.

The CPU 51 in the communication apparatus 311-1 may also transmit the authentication of the mobile terminal 32 to the mobile terminal 313 via the communication unit 56 and the network 312.

Upon receiving the notification of the authentication via communication antenna 42, the radio communication unit 108 in the mobile terminal 32 notifies the authentication processing controller 131 of the authentication. In step S212, the authentication processing controller 131 controls the content transmitter 321, thereby transmitting the video data of the currently viewed content via the radio communication unit 108 and the communication antenna 42.

The communication unit 56 in the communication apparatus 311-2 receives the authentication of the mobile terminal 32 from the communication apparatus 311-1 via the network 312, and supplies the CPU 51 with the authentication of the mobile terminal 32. The CPU 51 thus recognizes the authentication of the mobile terminal 32.

The radio communication unit 58 in the communication apparatus 311-2 receives the video data from the mobile terminal 32 via the directional antenna 41-2. In step S231, the CPU 51 controls the communication unit 56, thereby transmitting the video data received by the radio communication unit 58 to the mobile terminal 313 via the network 312.

In step S241, the radio communication unit 108 in the mobile terminal 313 receives the video data from the communication apparatus 311-2 via the network 312 and the communication antenna 42, and supplies the data acquisition controller 231 (FIG. 12) in the mobile terminal 313 with the received data.

The data acquisition controller 231 controls the data generator 232, thereby generating a display signal responsive to the video data. The data generator 232 outputs the generated display signal to the data output controller 233. In step S242, the data output controller 233 controls the video signal processor 110, thereby causing an image responsive to the display signal from the data generator 232 to be displayed on the LCD 112.

As shown in FIG. 18, the same image as the image displayed on the LCD 112 of the mobile terminal 32 is displayed on the LCDs 112 of the mobile terminals 313-1 through 313-3.

The user can thus connect the mobile terminal 32 to the network 312 by simply placing the mobile terminal 32 within the communication coverage area 41AB of the directional antennas 41-1 and 41-2 for a predetermined period of time.

The data of the content of the mobile terminal 32 can be transmitted to the other mobile terminals 32 connected to the network 312 and displayed on the other mobile terminals 32.

The transmission of the video data via the communication apparatus 311-2 in step S231 of FIG. 19 may be performed by the two apparatuses 311-1 and 311-2. In such a case, the transmission of the contents subsequent to the authentication notification in step S222 is limited to only the mobile terminal 32 placed within the communication coverage area 41AB. The service limited to a particular area is thus provided.

Figure 20:
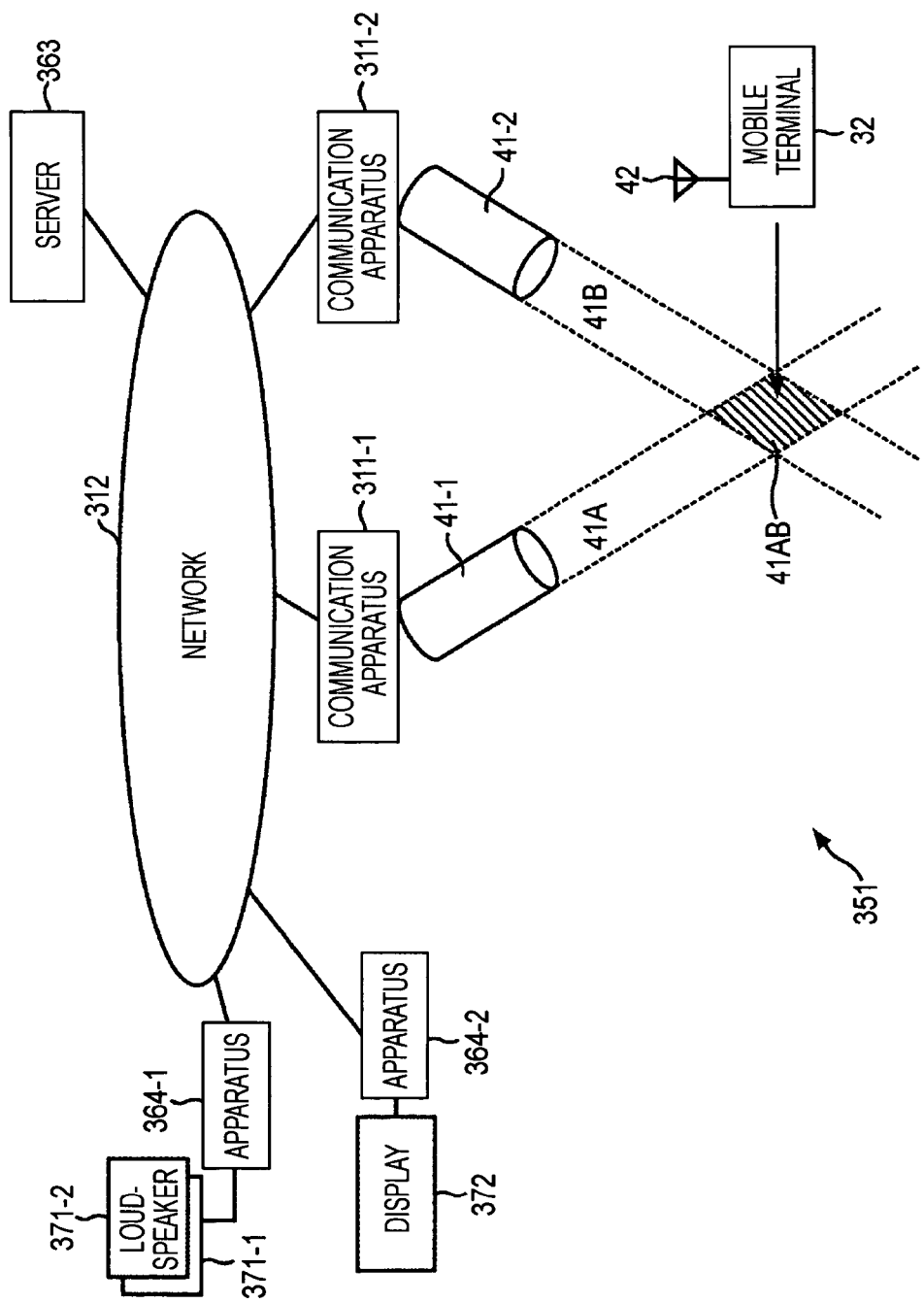
FIG. 20 illustrates a further configuration of the service providing system of FIG. 15.

FIG. 20 illustrates a service providing system 351 of one embodiment of the present invention. The service providing system 351 is similar to the service providing system 301 of FIG. 15. Elements identical to those described with reference to FIG. 4 are designated with the same reference numerals.

A network 312 of FIG. 20 is a radio LAN, for example. The network 312 connects to a server 363 managing the service providing system 351. Instead of the mobile terminals 313-1 through 313-3 of FIG. 15, an apparatus 364-1 including large loudspeakers 371-1 and 371-2, and an apparatus 364-2 including a large-screen display 372.

In the service providing system 351, the mobile terminal 32 is connected to the network 312 as a result of authentication of the mobile terminal 32 by the communication apparatuses 311-1 through 311-2. Data of contents of the mobile terminal 32 (or a server 363) currently viewed on the mobile terminal 32 is transmitted to the apparatuses 364-1 and 364-2 via the network 312 to be output from the apparatuses 364-1 and 364-2.

The server 363 manages data among the communication apparatuses 311-1 through 311-2 (e.g., the authentication information and the encryption key data), and stores a connection list of the network 312. The server 363 thus manages connection of the network 312. Furthermore, the server 363 stores the data of the contents, and provides a terminal or an apparatus accessing thereto with data of a content via the network 312.

As the mobile terminals 313-1 through 313-3 connected to the network 33 of FIG. 4, the communication terminals 311-1 through 311-2 and the server 363 connected to the network 312 of FIG. 20 may be considered as a single service providing apparatus.

The apparatus 364-1 including the large loudspeakers 371-1 and 371-2 receives audio data of a content supplied from apparatuses connected to the network 312 (such as the communication apparatuses 311-1 through 311-2 or the server 363), and outputs sounds responsive to the received audio data from the large loudspeakers 371-1 and 371-2.

The apparatus 364-2 having the large-screen display 372 receives video data (a still image or a moving image) of contents supplied from apparatuses (e.g., the communication apparatuses 311-1 through 311-2 or the server 363) connected to the network 312, and causes the large-screen display 372 to display an image responsive to the received video data.

If the mobile terminal 32 is permitted to be connected to the network 312, the apparatuses 364-1 and 364-2 can receive data from the mobile terminal 32 via the network 312.

As the service providing system 301 of FIG. 15, the service providing system 351 of FIG. 20 provides the service of connecting to the network 312 and exchanging information with terminals and apparatus connected to the network 312 on the premise that the mobile terminal held by the user is placed in a predetermined area (i.e., the communication coverage area 41AB) for a predetermined period of time.

If there is no need for distinguishing between the apparatuses 364-1 and 364-2, each of the apparatuses 364-1 and 364-2 is simply referred to as an apparatus 364.

Figure 21:
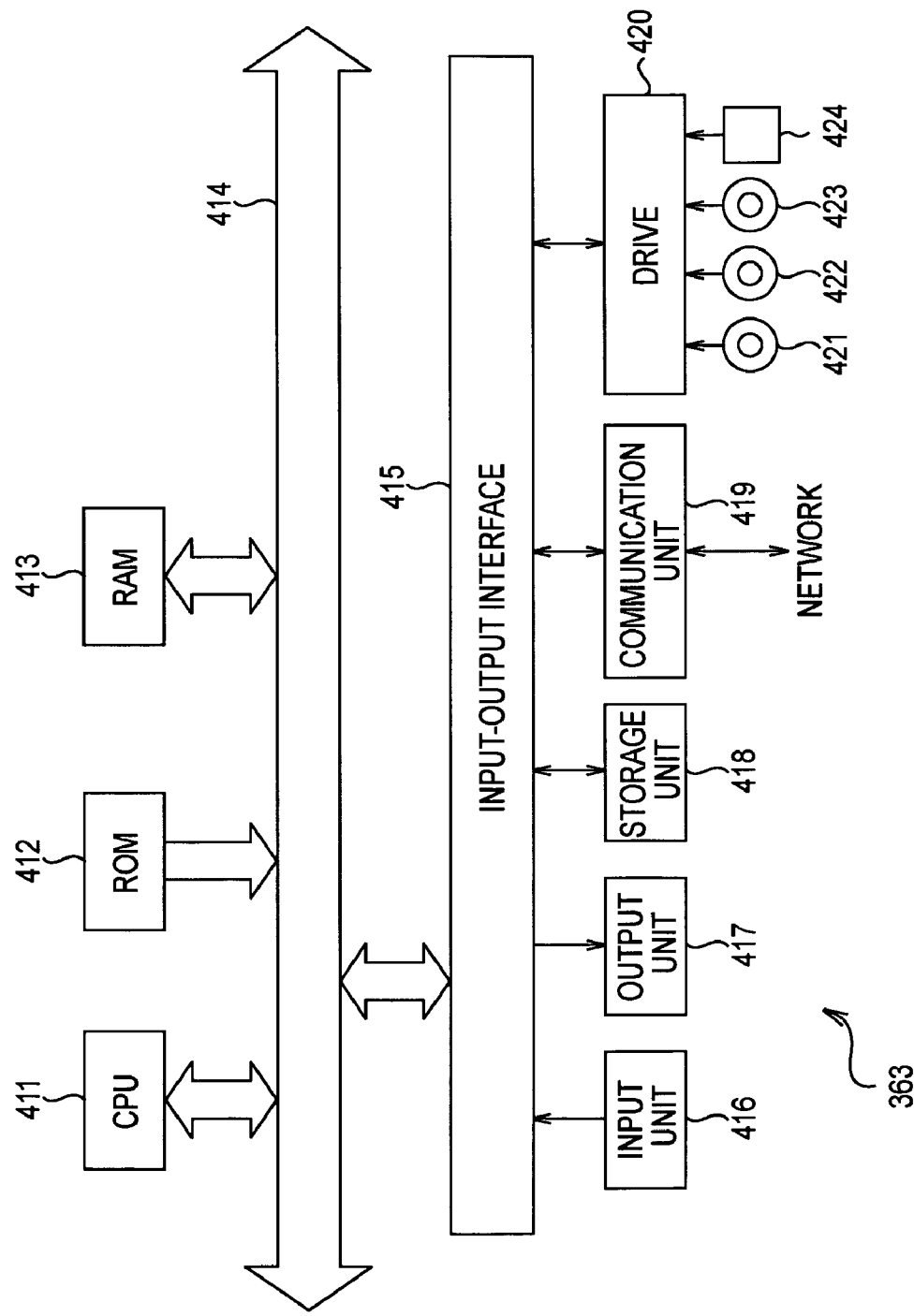
FIG. 21 is a block diagram of a server of FIG. 20.

FIG. 21 is a block diagram illustrating the server 363.

A CPU 411 performs a variety of processes under the control of a program stored on a ROM 412 or a program loaded from a storage unit 418 to a RAM 413. The RAM 413 also stores data required by the CPU 411 in the execution of the variety of processes.

The CPU 411, the ROM 412, and the RAM 413 are interconnected to each other via a bus 414. The bus 414 also connects to an input-output interface 415.

Connected to the input-output interface 415 are an input unit 416 including a keyboard, a mouse, etc., an output unit 417 including a display such as a cathode-ray tube (CRT), a liquid-crystal display (LCD), or the like, and a loudspeaker, a storage unit 418 such as a hard disk, and a communication unit 419 including a modem, a terminal adaptor, and a network interface. The communication unit 419 performs a communication process via the network 312.

The input-output interface 415 also connects to a drive 420 as necessary. A removable medium such as magnetic disk 421, an optical disk 422, a magneto-optical disk 423, or a semiconductor memory 424, is loaded onto the drive 420. A computer program read from the removable medium is installed onto the storage unit 418 as necessary.

Each of the apparatuses 364-1 and 364-2 includes a computer basically identical in structure to the server 363 of FIG. 21, although the detail of the structure thereof is omitted herein. In the discussion that follows, the structure of FIG. 21 also applies as the structure of the apparatuses 364-1 and 364-2.

When the CPU 411 performs a variety of programs, the computer of FIG. 21 functions as each of the server 363 and the apparatuses 364-1 and 364-2.

When a predetermined program is performed by the CPU 411 in each of the apparatuses 364-1 and 364-2, the functional block diagram of FIG. 12 is implemented. The functional block diagram of FIG. 12 thus applies as the functional block diagram of the apparatuses 364-1 and 364-2.

Figure 22:
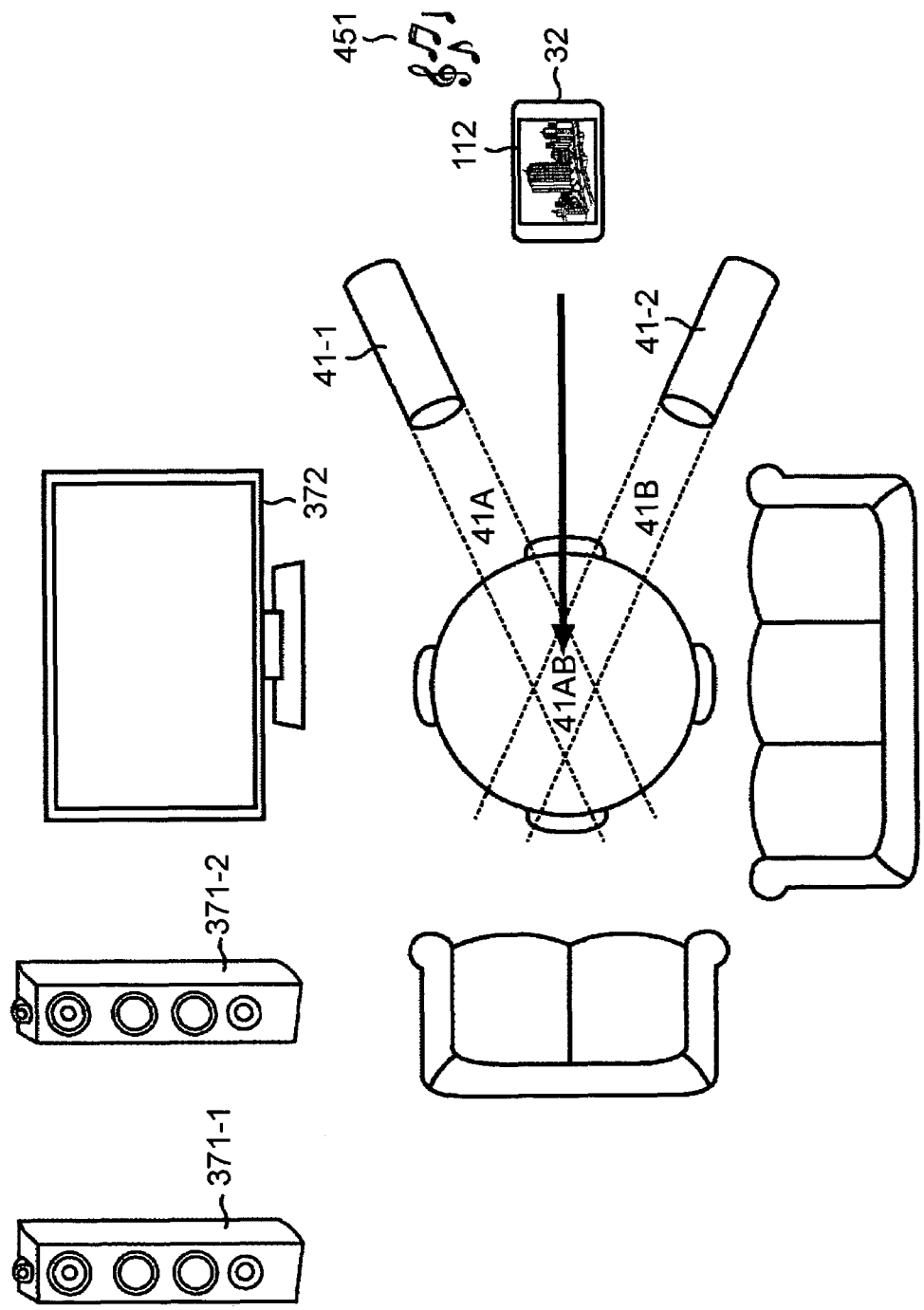
FIG. 22 illustrates services provided by the service providing system of FIG. 20.
Figure 23:
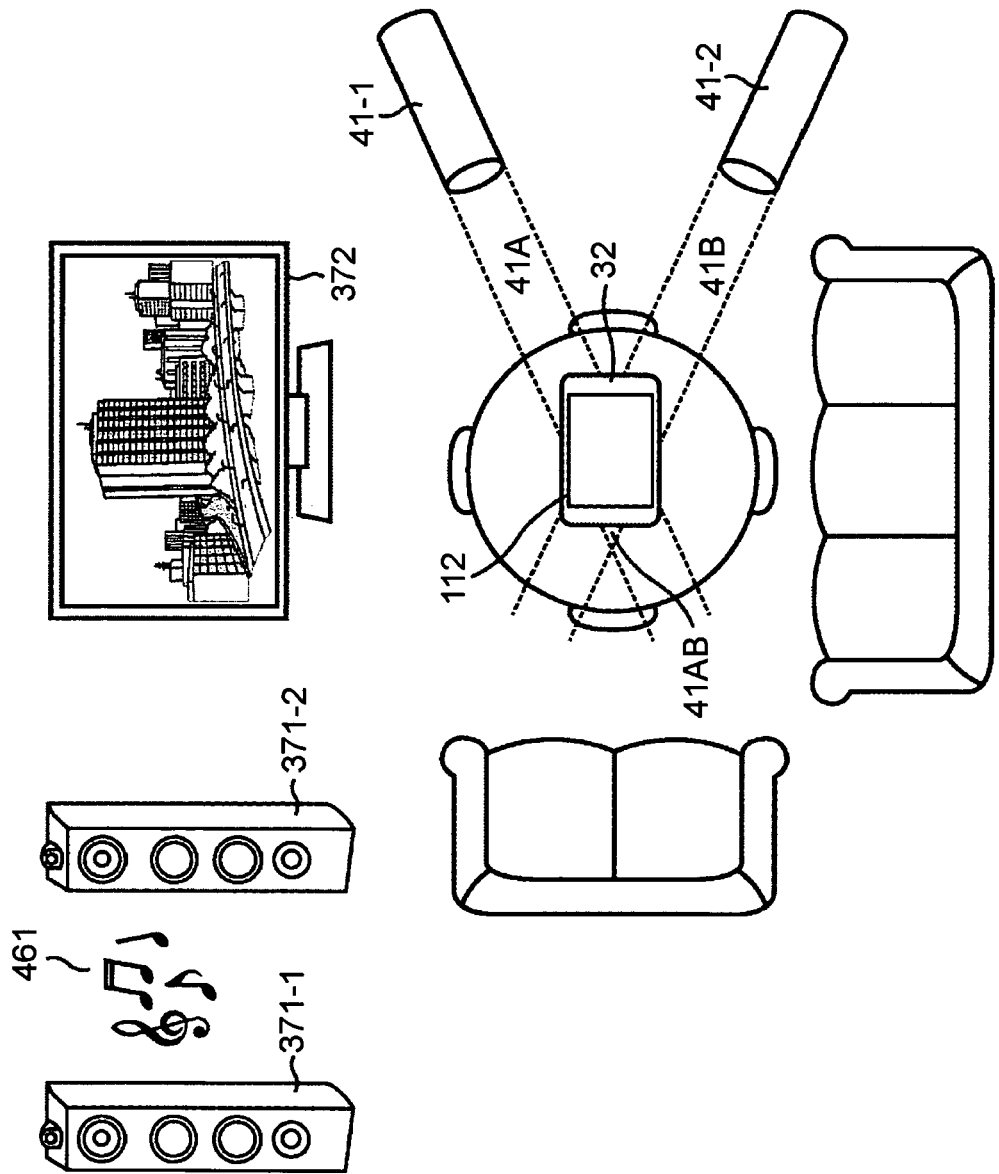
FIG. 23 illustrates services provided by the service providing system of FIG. 20.

With reference to FIGS. 22 and 23, the service provided by the service providing system 351 of FIG. 20 is discussed. Referring to FIGS. 22 and 23, there are shown the directional antenna 41, the large loudspeakers 371-1 and 371-2, and the large-screen display 372. The corresponding communication apparatus 311, and apparatuses 364-1 and 364-2 are not shown.

Connected to the network 312 of FIG. 20 are the directional antennas 41-1 and 41-2 (the communication apparatuses 311-1 through 311-2), a server 362 (not shown), the large loudspeakers 371-1 and 371-2 (apparatus 364-1), and the large-screen display 372 (apparatus 364-1), all arranged in a room (space) as shown in FIG. 22. No output is provided from the large loudspeakers 371-1 and 371-2 and the large-screen display 372.

For example, a user operates the mobile terminal 32 carried by himself to communicate with the server 362 in a one-to-one mode (in an ad hoc mode), and views a content stored on the storage unit 418 of the server 363. More specifically, the mobile terminal 32 controls the radio communication unit 108, thereby receiving video data (of a moving image) and audio data of a desired content from the server 362 via the communication antenna 42. An image responsive to the received video data is thus displayed on the LCD 112 and a sound responsive to the received audio data is output from the loudspeaker 113.

The LCD 112 of the mobile terminal 32 of FIG. 22 displays an image of a "background" corresponding to the video of the content from the server 362, and a sound 451 responsive to the audio data of the content from the server 362 is output from the loudspeaker 113.

The user places the mobile terminal 32 in the communication coverage area 41AB centered on a table in a room where the communication apparatuses 311-1 through 311-2 are arranged. The mobile terminal 32 is thus placed in the communication coverage area 41AB for a predetermined period of time.

As in FIG. 17, original data of the authentication information is transmitted from the communication apparatuses 311-1 through 311-2 to the mobile terminal 32 present within the communication coverage area 41AB. The mobile terminal 32 acquires the authentication information and transmits the authentication information via the communication antenna 42 in response to a request from the communication apparatus 311-1.

In response to the authentication information from the mobile terminal 32, the communication apparatus 311-1 authenticates the mobile terminal 32, thereby providing service to the mobile terminal 32. Referring to FIG. 22, the communication apparatus 311-1 permits the mobile terminal 32 to be connected to the network 312 by issuing the notification of authentication to the mobile terminal 32 and apparatuses connected to the network 312. Via the network 312, the mobile terminal 32 can now communicate with the apparatus connected to the network 312.

More specifically, with reference to FIG. 22, the mobile terminal 32 causes the large loudspeakers 371-1 and 371-2 of the apparatus 364-1 to output the sound of the currently viewed content in response to the notification of the authentication from the communication apparatus 311-1, and causes the large-screen display 372 of the apparatus 364-2 to display the image of the currently received content.

More specifically, the mobile terminal 32 transmits the currently viewed content information via the radio communication unit 108 and the communication antenna 42. The content information contains identification information, the name, and the position of playback of the currently viewed content. The communication apparatus 311-2 receives the content information from the mobile terminal 32 via the directional antenna 41 and the radio communication unit 58, and transmits via the communication unit 56 the received content information to the server 363 connected to the network 312.

Upon receiving the content information from the mobile terminal 32, the server 363 stops transmitting the data of the content that has been directly transmitted to the mobile terminal 32 in response to the content information. From the playback position information contained in the content information, the server 363 transmits the audio data of the content to the apparatus 364-1 via the network 312, and the video data of the content to the apparatus 364-2 via the network 312.

Upon receiving the audio data of the content via the network 312 and the communication unit 419, the apparatus 364-1 outputs the sound responsive to the received audio data to the large loudspeakers 371-1 and 371-2. Upon receiving the video data of the content via the network 312 and the communication unit 419, the apparatus 364-2 displays the image responsive to the received video data on the large-screen display 372.

As shown in FIG. 23, the sound continued from the sound that has been output from the loudspeaker 113 of the mobile terminal 32 of FIG. 22 is output from the large loudspeakers 371-1 and 371-2. The image of the "background" continued from the image that has been displayed from the LCD 112 of the mobile terminal 32 of FIG. 22 is displayed on the large-screen display 372.

As shown in FIG. 23, the same image is displayed to show that the image of the same content is continuously displayed.

The mobile terminal 32 is permitted to be connected to the network 312. The mobile terminal 32 may directly transmit a command to the server 363.

The process of the service providing system 351 of FIG. 20 is described below with reference to a flowchart of FIG. 24.

As previously discussed with reference to FIG. 22, no outputs are currently provided by the large loudspeakers 371-1 and 371-2 and the large-screen display 372, each connected to the network 312 in the room (space).

The LCD 112 in the mobile terminal 32 now displays the image of the "background" responsive to the video data of the content from the server 362 while the loudspeaker 113 outputs the sound 451 responsive to the audio data of the content from the server 362.

The user places the mobile terminal 32 in the communication coverage area 41AB centered on the table in the room where the communication apparatuses 311-1 through 311-2 are arranged. The user continuously places the mobile terminal 32 in the communication coverage area 41AB for a predetermined period of time.

The mobile terminal 32, and the communication apparatuses 311-1 through 311-2 perform steps S11 through S13, steps S21 and S22, and steps S31 and S32 discussed with reference to FIG. 9.

The mobile terminal 32 receives encrypted authentication data from the communication apparatus 311-1, encryption key data from the communication apparatus 311-2, and obtains authentication information from the authentication data and the encryption key data. The authentication data transmitter 133 is thus supplied with the authentication information. This process is identical to the process discussed with reference to FIG. 9 or FIG. 19, and the discussion thereof is not repeated herein.

Upon transmitting the encrypted authentication data via the directional antenna 41-1, the radio communication unit 58 in the communication apparatus 311-1 transmits a calling radio wave requesting the authentication information toward the communication coverage area 41A (containing the communication coverage area 41AB) via the directional antenna 41-1.

Upon receiving the calling radio wave from the communication apparatus 311-1, the radio communication unit 108 in the mobile terminal 32 present within the communication coverage area 41AB so notifies the authentication processing controller 131.

In step S311 of FIG. 24, the authentication processing controller 131 controls the authentication data transmitter 133, thereby transmitting the authentication information via the radio communication unit 108 and the communication antenna 42.

The radio communication unit 58 in the communication apparatus 311-1 receives the authentication information from the mobile terminal 32 via the directional antenna 41-1, and supplies the CPU 51 with the received authentication information. In step S321, the CPU 51 executes an authentication process.

The CPU 51 in the communication apparatus 311-1 determines whether the current authentication information is correct one. If it is determined that the current authentication information is correct one, processing proceeds to step S322. The CPU 51 in the communication apparatus 311-1 issues the notification of authentication via the radio communication unit 58 and the directional antenna 41-1 while issuing the notification of authentication of the mobile terminal 32 to the communication apparatus 311-2 and the server 363 via the communication unit 56 and the network 312.

In response, the communication unit 419 in the server 363 receives the notification of authentication of the mobile terminal 32 from the communication apparatus 311-1 via the network 312, and supplies the notification of authentication of the mobile terminal 32 to the CPU 411. The CPU 411 adds the mobile terminal 32 to a connection list of the network 312.

The CPU 51 in the communication apparatus 311-1 may also issue the notification of authentication of the mobile terminal 32 to each apparatus 364 via the communication unit 56 and the network 312.

The radio communication unit 108 in the mobile terminal 32 receives the notification of authentication via the communication antenna 42, and notifies the authentication processing controller 131 of the authentication. In step S312, the authentication processing controller 131 controls the content transmitter 321, thereby causing the content transmitter 321 to transmit the currently viewed content information via the radio communication unit 108 and the communication antenna 42.

When the radio communication unit 58 in the communication apparatus 311-1 receives the content information from the mobile terminal 32 via the directional antenna 41-1, the CPU 51 controls in step S323 the communication unit 56, thereby causing the communication unit 56 to transmit the content information received by the radio communication unit 58 to the server 363 via the network 312.

Upon receiving the content information from the communication apparatus 311-1 via the network 312, the communication unit 419 in the server 363 supplies the received content information to the CPU 411. In step S331, the CPU 411 controls the communication unit 419 in response to the content information (such as the identification information, the name, and the playback position of the currently viewed content), thereby stopping data transmission of the content to the mobile terminal 32 and transmit the data of the content from the playback position to the apparatus 364 via the network 312.

In step S341, the communication unit 419 in the apparatus 364 receives the data of the content from the server 363 via the network 312, and then supplies the received data to the data acquisition controller 231 (FIG. 12) in the apparatus 364. Processing proceeds to step S342.

The data acquisition controller 231 in the apparatus 364-1 controls the data generator 232, causing the data generator 232 to generate the audio signal responsive to the audio data of the content. The data generator 232 outputs the generated audio signal to the data output controller 233. In step S342, the data output controller 233 causes the large loudspeakers 371-1 and 371-2 in the output unit 417 to output the sound responsive to the audio signal from the data generator 232.

The data acquisition controller 231 in the apparatus 364-2 controls the data generator 232, thereby causing the data generator 232 to generates the display signal responsive to the video data of the content. The data generator 232 outputs the generated display signal to the data output controller 233. In step S342, the data output controller 233 causes the large-screen display 372 of the output unit 417 to display the image responsive to the display signal from the data generator 232.

As shown in FIG. 23, the large loudspeakers 371-1 and 371-2 output the sound continued from the sound that has been output from the loudspeaker 113 of the mobile terminal 32 of FIG. 22. The large-screen display 372 displays the image of the "background" continued from the image that has been displayed on the LCD 112 of the mobile terminal 32 of FIG. 22.

The user can thus connect the mobile terminal 32 to the network 312 by simply placing the mobile terminal 32 within the communication coverage area 41AB of the directional antennas 41-1 and 41-2.

More specifically, by simply placing the mobile terminal in the communication coverage area of a plurality of directional antennas, the user can enjoy the content on a large loudspeaker and large-screen displays of other apparatuses connected to the network in succession to the content that has been enjoyed on an LCD and loudspeaker on a small mobile terminal.

The communication coverage area of the plurality of directional antennas is formed within the predetermined space. Using the formed communication coverage area, a user in a predetermined space can enjoy services of different levels depending on the characteristics of the area.

In the above discussion, the moving image, the still image, and the music content are handled. The present invention is not limited to the moving image, the still image, and the music content and is also applicable to contents such as application software programs.

In the above discussion, the apparatuses connected to the network include the mobile terminal, and the apparatuses including the large loudspeaker or the large-screen displays. The apparatuses connected to the network may further include a personal computer, personal digital assistants (PDAs), reproducing apparatuses such as audio visual (AV) apparatuses, and consumer electronics (CE) including recording and reproducing apparatuses, and home electronics.

In the above discussion, the radio communication method of using the directional antenna is based on the IEEE 802.11b standard. The present invention is not limited to the IEEE 802.11b standard. Communication method based on the IEEE 802.11a standard, Bluetooth®, or other standard may be used. The present invention is also applicable to a radio communication technique providing directivity without using directional antenna.

The above-referenced series of process steps may be performed using hardware or software.

If the above-referenced series of process steps is performed using software, the program of the software may be installed from a recording medium onto a computer built in dedicated hardware or a general-purpose personal computer enabled to perform a variety of functions with a variety of programs installed thereon.

As shown in FIG. 5 or 21, the storage medium includes a package medium such as a removable medium distributed to a user separate from a computer to provide the user with the program. The removable media include one of the magnetic disk (including a flexible disk) 81 or 421, the optical disk (such as compact disk read-only memory (CD-ROM)), or digital versatile disk (DVD)) 82 or 422, the magneto-optical disk (such as mini-disk (MD®) 83 or 423, and the semiconductor memory 84 or 424. The storage media also include the read-only memory (ROM) 53 or 412 or a hard disk contained in the storage unit 57 or 418, each supplied in the apparatus to the user and storing the program.

The program may be installed from the above-mentioned removable medium to the computer of FIG. 5 or 21. The program is also transmitted to the computer of FIG. 5 or 21 from a download site via digital satellite broadcasting in a wireless fashion, or transmitted to the computer of FIG. 5 or 21 in a wired fashion via a local area network (LAN) or via a network (not shown).

The process steps described in the flowcharts may be performed in the time-series order sequence, as previously stated. Alternatively, the process steps may be performed in parallel or separately.

In this specification, the system refers to a system including a plurality of apparatuses.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing system comprising an information providing apparatus for providing a service, and a mobile terminal for receiving the service, the information providing apparatus comprising:

a plurality of directional antennas including a first directional antenna and a second directional antenna defining a first area in which communication coverage areas of the directional antennas overlap; and a plurality of data communication means for transmitting data, including first data transmitted using the first directional antenna and second data transmitted using the second directional antenna, to the mobile terminal in the first area, and for receiving authentication information from the mobile terminal, wherein the authentication information is provided by the mobile terminal only when the first data and the second data are received by the mobile terminal within a predetermined period of time, and the mobile terminal comprising:

data receiving means for receiving the data in the first area; and data processing means for processing the data.

2. The information processing system according to claim 1, wherein:

the data forms a content, the data processing means generates an output signal formed of the data of the content in response to the content received by the data receiving means, and the mobile terminal further comprises output control means for outputting the output signal to a user.

3. The information processing system according to claim 1, wherein the data contains information for authentication, and wherein the first data and the second data are required for the information providing apparatus to perform authentication.

4. The information processing system according to claim 3, wherein the data processing means obtains the information for authentication using a plurality of units of data received by the data receiving means, and wherein the mobile terminal further comprises authentication information transmitting means for transmitting, to the information providing apparatus, the information for authentication obtained by the data processing means.

5. The information processing system according to claim 4, wherein the information providing apparatus further comprises:

authentication information receiving means for receiving the information for authentication via the directional antennas; and authentication means for authenticating the mobile terminal based on the information for authentication.

6. An information processing method of an information processing system including an information providing apparatus for providing a service, and a mobile terminal for receiving the service, the method comprising:

transmitting data to the mobile terminal present in a first area defined by the overlapping communication coverage areas of a first directional antenna and a second directional antenna, wherein transmitting data includes transmitting first data using the first directional antenna and transmitting second data using the second directional antenna;

receiving the data in the first area; and performing authentication using the data, wherein the data received serves as authentication information only when the first data and the second data are received within a predetermined period of time.

7. An information processing system comprising an information providing apparatus for providing a service, and a mobile terminal for receiving the service, the information providing apparatus comprising:

a plurality of directional antennas including a first directional antenna and a second directional antenna defining a first area in which communication coverage areas of the directional antennas overlap; and a plurality of data communication units transmitting data, including first data transmitted using the first directional antenna and second data transmitted using the second directional antenna, to the mobile terminal in the first area, and receiving authentication information from the mobile terminal, wherein the authentication information is provided by the mobile terminal only when the first data and the second data are received by the mobile terminal within a predetermined period of time, and the mobile terminal comprising:
　　a data receiving unit for receiving the data in the first area; and
　　a data processing unit for processing the data.

* * * * *